(12) United States Patent
Hanada et al.

(10) Patent No.: US 12,079,712 B2
(45) Date of Patent: Sep. 3, 2024

(54) SOLID STATE IMAGE CAPTURING SYSTEM, SOLID STATE IMAGE CAPTURING DEVICE, INFORMATION PROCESSING DEVICE, IMAGE PROCESSING METHOD, INFORMATION PROCESSING METHOD

(71) Applicant: SONY SEMICONDUCTOR SOLUTIONS CORPORATION, Kanagawa (JP)

(72) Inventors: Seigo Hanada, Kanagawa (JP); Suguru Kobayashi, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 575 days.

(21) Appl. No.: 17/275,410

(22) PCT Filed: Aug. 30, 2019

(86) PCT No.: PCT/JP2019/034127
§ 371 (c)(1),
(2) Date: Mar. 11, 2021

(87) PCT Pub. No.: WO2020/059464
PCT Pub. Date: Mar. 26, 2020

(65) Prior Publication Data
US 2022/0058411 A1 Feb. 24, 2022

(30) Foreign Application Priority Data

Sep. 21, 2018 (JP) ................................ 2018-177311

(51) Int. Cl.
*G06N 3/063* (2023.01)
*G06N 3/045* (2023.01)
(Continued)

(52) U.S. Cl.
CPC .............. *G06N 3/063* (2013.01); *G06N 3/045* (2023.01); *G06V 10/25* (2022.01); *G06V 10/764* (2022.01);
(Continued)

(58) Field of Classification Search
CPC ........ G06N 3/063; G06N 3/045; G06N 3/044; G06N 3/08; G06N 3/084; G06N 3/04;
(Continued)

(56) References Cited

U.S. PATENT DOCUMENTS 10,360,494 B2 * 7/2019 Wang .................. G06V 40/172
10,614,339 B2 * 4/2020 Jiang ................... G06V 10/454
(Continued)

FOREIGN PATENT DOCUMENTS

CA      2986860 A1   5/2018
CA      2986863 A1   5/2018
(Continued)

OTHER PUBLICATIONS

Bong, et al., "A Low-Power Convolutional Neural Network Face Recognition Processor and a CIS Integrated With Always-on Face Detector", IEEE Journal of Solid-State Circuits, vol. 53, No. 1, Dec. 31, 2017, pp. 115-123.
(Continued)

*Primary Examiner* — Michael S Osinski
(74) *Attorney, Agent, or Firm* — CHIP LAW GROUP

(57) ABSTRACT

A solid-state image capturing system (1) includes a solid-state image capturing device (100) and an information processing device (200). The solid-state image capturing device (100) includes a first DNN processing unit (130) that executes, on image data, a part of a DNN algorithm by a first DNN to generate a first result. The information processing device (200) includes a second DNN processing unit (230) that executes, on the first result acquired from the solid-state
(Continued)

image capturing device, remaining of the DNN algorithm by a second DNN to generate a second result.

18 Claims, 15 Drawing Sheets

(51) Int. Cl.
    *G06V 10/25*     (2022.01)
    *G06V 10/764*     (2022.01)
    *G06V 10/82*     (2022.01)
    *G06V 10/94*     (2022.01)
    *H04N 25/771*     (2023.01)

(52) U.S. Cl.
    CPC .............. *G06V 10/82* (2022.01); *G06V 10/94* (2022.01); *G06V 10/95* (2022.01); *H04N 25/771* (2023.01)

(58) Field of Classification Search
    CPC ...... G06N 3/048; G06V 10/25; G06V 10/764; G06V 10/82; G06V 10/94; G06V 10/95; G06V 10/454; G06V 30/19173; G06V 40/103; G06V 40/168; H04N 25/771; H04N 23/555; H04N 23/611; H04N 23/617; G06T 2207/20084; G06T 2207/20081; G06T 7/11; G06T 2207/10016; G06T 7/70; G06T 2200/28; G06T 2207/20224; G06T 2207/30201; G06T 2207/20021; G06F 18/214; G06F 18/24143; G06F 18/2148; G06F 18/2414; G06F 18/253; G06F 18/213; G06F 18/24
    See application file for complete search history.

(56) References Cited

U.S. PATENT DOCUMENTS

| | | | | |
|---|---|---|---|---|
| 10,878,592 | B2* | 12/2020 | Croxford | G06T 7/174 |
| 11,062,453 | B2* | 7/2021 | Shi | G06T 7/11 |
| 11,227,182 | B2* | 1/2022 | Li | G06N 3/08 |
| 11,508,251 | B2* | 11/2022 | He | G06N 3/045 |
| 11,551,433 | B2* | 1/2023 | Lee | G06V 10/25 |
| 11,651,230 | B2* | 5/2023 | Li | G06N 3/088 |
| | | | | 726/25 |
| 2016/0140424 | A1* | 5/2016 | Wang | G06F 18/2414 |
| | | | | 382/156 |
| 2016/0155049 | A1* | 6/2016 | Choi | G06N 3/082 |
| | | | | 706/16 |
| 2017/0017859 | A1* | 1/2017 | Uchiyama | G06F 18/256 |
| 2018/0025249 | A1* | 1/2018 | Liu | G06V 10/255 |
| | | | | 382/158 |
| 2018/0039853 | A1* | 2/2018 | Liu | G06V 10/768 |
| 2018/0150681 | A1 | 5/2018 | Wang et al. | |
| 2018/0150684 | A1 | 5/2018 | Wang et al. | |
| 2018/0150740 | A1* | 5/2018 | Wang | G06N 3/08 |
| 2018/0157916 | A1* | 6/2018 | Doumbouya | G06V 40/103 |
| 2018/0211130 | A1* | 7/2018 | Jiang | G06V 10/82 |
| 2018/0330238 | A1* | 11/2018 | Luciw | G06V 20/17 |
| 2019/0026538 | A1* | 1/2019 | Wang | G06V 40/172 |
| 2019/0030371 | A1* | 1/2019 | Han | A61N 5/1039 |
| 2019/0065817 | A1* | 2/2019 | Mesmakhosroshahi | |
| | | | | G06V 20/698 |
| 2019/0079533 | A1* | 3/2019 | Zhu | G06N 5/025 |
| 2019/0156144 | A1* | 5/2019 | Li | G06F 18/253 |
| 2019/0156157 | A1* | 5/2019 | Saito | G06F 18/217 |
| 2019/0164290 | A1* | 5/2019 | Wang | G06N 3/08 |
| 2019/0171864 | A1* | 6/2019 | Nakayama | G06N 5/022 |
| 2019/0204448 | A1 | 7/2019 | Eki | |
| 2020/0026987 | A1* | 1/2020 | Gudla | G06F 17/16 |
| 2020/0134375 | A1* | 4/2020 | Zhan | G06N 3/084 |
| 2020/0349722 | A1* | 11/2020 | Schmid | G06T 7/269 |
| 2021/0073586 | A1* | 3/2021 | Sagi | G06N 3/084 |
| 2021/0224977 | A1* | 7/2021 | Jia | G06F 18/24 |
| 2021/0365716 | A1* | 11/2021 | Li | G06V 10/764 |
| 2022/0058411 | A1* | 2/2022 | Hanada | G06N 3/063 |
| 2022/0076117 | A1* | 3/2022 | Amon | G06V 10/454 |

FOREIGN PATENT DOCUMENTS

| | | |
|---|---|---|
| CN | 108399409 A | 8/2018 |
| JP | 2015-191334 A | 11/2015 |
| JP | 2017187850 A | 10/2017 |
| JP | 2018-527660 A | 9/2018 |
| KR | 10-2018-0062422 A | 6/2018 |
| KR | 10-2018-0062423 A | 6/2018 |
| WO | 2018/051809 A1 | 3/2018 |

OTHER PUBLICATIONS

International Search Report and Written Opinion of PCT Application No. PCT/JP2019/034127, issued on Oct. 15, 2019, 09 pages of ISRWO.

Extended European Search Report of EP Application No. 19862570. 9, issued on Oct. 15, 2021, 09 pages.

"Microcontroller", Wikipedia, XP055848161, Sep. 16, 2018, 14 pages.

Bong, et al., "A Low-Power Convolutional Neural Network Face Recognition Processor and a CIS Integrated With Always-on Face Detector", IEEE Journal of Solid-State Circuits, USA, vol. 53, No. 1, XP011674934, Issn: 0018-9200, Jan. 1, 2018, pp. 115-123.

Office Action for CN Patent Application No. 201980060063.7, issued on May 22, 2024, 4 pages of English Translation and 04 pages of Office Action.

* cited by examiner

SOLID STATE IMAGE CAPTURING SYSTEM, SOLID STATE IMAGE CAPTURING DEVICE, INFORMATION PROCESSING DEVICE, IMAGE PROCESSING METHOD, INFORMATION PROCESSING METHOD

CROSS REFERENCE TO RELATED APPLICATIONS

This application is a U.S. National Phase of International Patent Application No. PCT/JP2019/034127 filed on Aug. 30, 2019, which claims priority benefit of Japanese Patent Application No. JP 2018-177311 filed in the Japan Patent Office on Sep. 21, 2018. Each of the above-referenced applications is hereby incorporated herein by reference in its entirety.

FIELD

The present disclosure relates to a solid-state image capturing system, a solid-state image capturing device, an information processing device, an image processing method, an information processing method, and a program.

BACKGROUND

In recent years, there have been proposed various devices to which neural networks are provided. For example, Patent Literature 1 discloses a technology capable of improving identification properties for images on the basis of likelihood that indicates probability of a detection object.

CITATION LIST

Patent Literature

Patent Literature 1: JP 2015-191334 A

SUMMARY

Technical Problem

Incidentally, devices represented by a digital camera and the like is provided with an image sensor including a Complementary Metal Oxide Semiconductor (CMOS) and a Digital Signal Processor (DSP). In recent years, from viewpoints of diversification and acceleration in image processing, protection of personal information, and the like; it is desired that a Deep-Neural-Network (DNN) function is provided to an image sensor so as to execute advanced processes, for example.

However, in Patent Literature 1, an image sensor is to output a target image, and thus data amount to be output is large and further there presents possibility that personal information is not able to be protected.

In the present disclosure, there are proposed a solid-state image capturing system, a solid-state image capturing device, an information processing device, an image processing method, an information processing method, and a program capable of reducing data amount output from an image sensor while protecting personal information.

Solution to Problem

To solve the above-mentioned problem, a solid-state image capturing system according to the present disclosure includes a solid-state image capturing device; and an information processing device, wherein the solid-state image capturing device includes a first Deep-Neural-Network (DNN) processing unit that executes, on image data, a part of a DNN algorithm by a first DNN to generate a first result, and the information processing device includes a second DNN processing unit that executes, on the first result acquired from the solid-state image capturing device, remaining of the DNN algorithm by a second DNN to generate a second result.

DESCRIPTION OF EMBODIMENTS

The following describes preferable embodiments of the present disclosure in detail with reference to the attached drawings. In the present specification and the drawings, overlap of descriptions will be avoided by providing the same reference signs for constituent elements having substantially the same functional configuration.

The present disclosure will be described in the following order.

1. First Embodiment
  1-1. Configuration of Solid-State Image Capturing System According to First Embodiment
  1-2. Configuration of Deep-Neural-Network (DNN) Algorithm
  1-3. Process of Solid-State Image Capturing System According to First Embodiment
2. Second Embodiment
  2-1. Configuration of Solid-State Image Capturing System According to Second Embodiment
  2-2. Configuration of Solid-State Image Capturing System According to Modification of Second Embodiment
3. Hardware Configuration
4. Application Example to Endoscopic Surgery System
5. Application Example to Moving Body 1. First Embodiment

[1-1. Configuration of Solid-State Image Capturing System According to First Embodiment]

Figure 1:
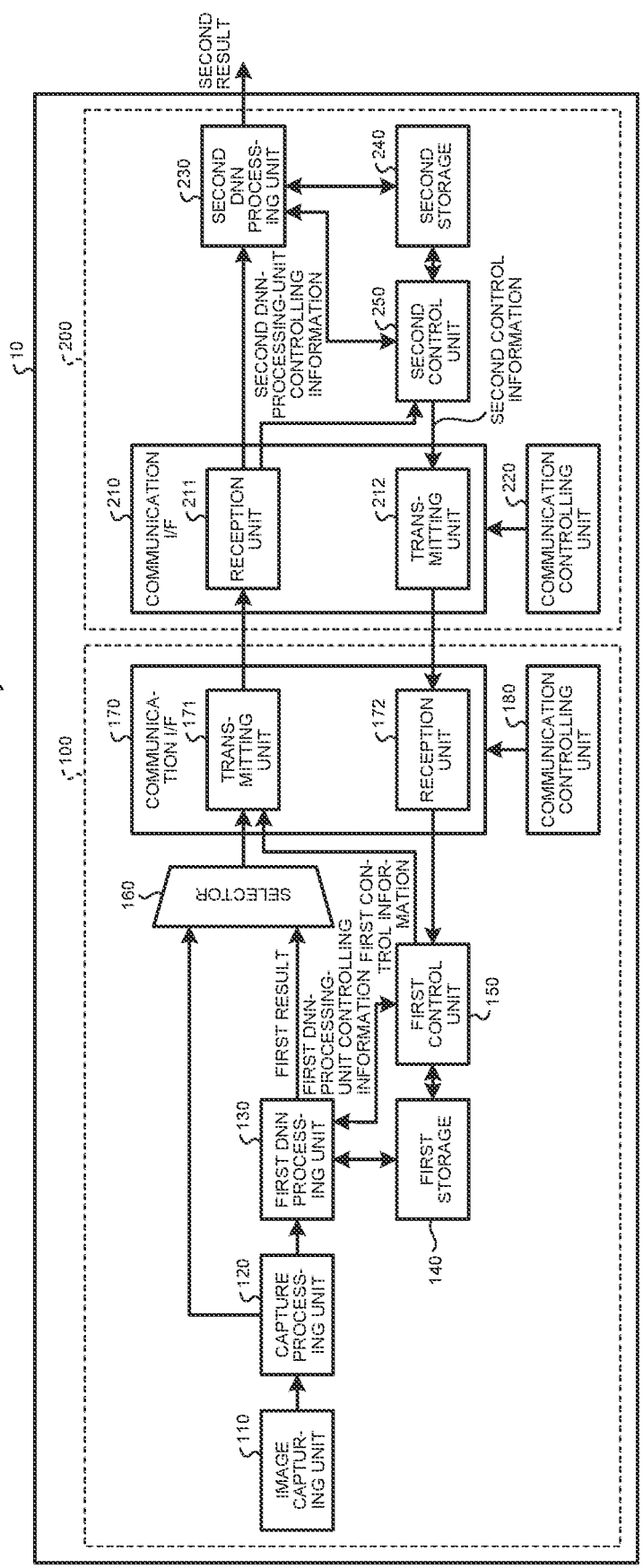
FIG. 1 is a block diagram illustrating one example of a configuration of a solid-state image capturing system according to a first embodiment of the present disclosure.

A configuration of a solid-state image capturing system according to a first embodiment of the present disclosure will be explained with reference to FIG. 1. FIG. 1 is a block diagram illustrating one example of a configuration of the solid-state image capturing system according to the first embodiment of the present disclosure.

As illustrated in FIG. 1, a solid-state image capturing system 1 includes a solid-state image capturing device 100 and an information processing device 200.

Figure 2:
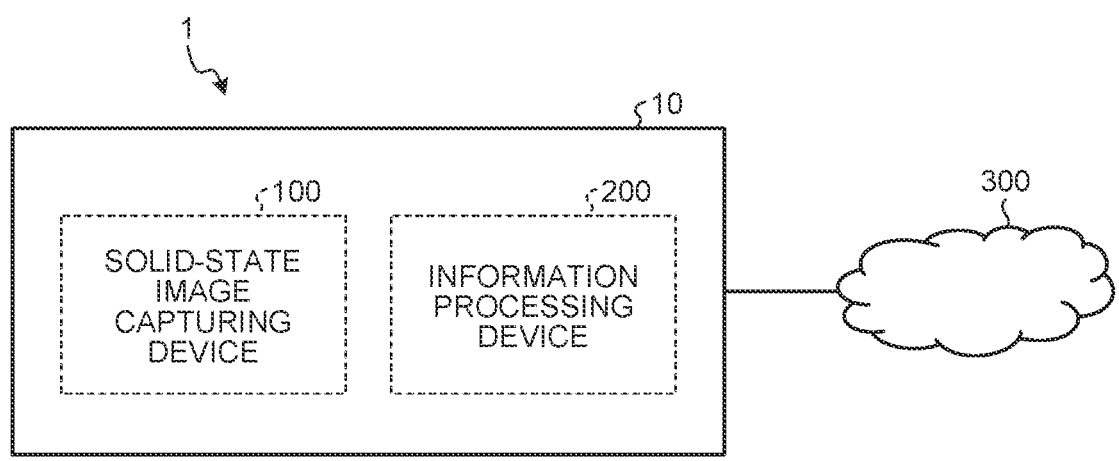
FIG. 2 is a diagram illustrating one example of a connection relation of the solid-state image capturing system according to the first embodiment of the present disclosure.

As illustrated in FIG. 2, both of the solid-state image capturing device 100 and the information processing device 200 are housed in a housing 10. In other words, the solid-state image capturing device 100 and the information processing device 200 are arranged in the same housing 10 as separated tips. The solid-state image capturing device 100 and the information processing device 200 are implemented by using a System-on-a-chip (SoC), a Multi-Chip Module (MCM), a System In a Package (SIP), a Small Outline Package (SOP), etc. The solid-state image capturing system 1 may be connected to an external device by using, for example, an Internet communication network 300 to be able to communicate with each other. The solid-state image capturing system 1 illustrated in FIG. 2 includes the single solid-state image capturing device 100 and the single information processing device 200, and this is merely one example so as not limit the present disclosure. The solid-state image capturing system 1 may include the plurality of solid-state image capturing devices 100 and the plurality of information processing device 200. The number of the solid-state image capturing devices 100 and that of the information processing devices 200 included in the solid-state image capturing system 1 may be different form each other. The solid-state image capturing system 1 may be applied to a Virtual Personal Assistant (VPA) and an on-vehicle camera, for example.

As illustrated in FIG. 1, the solid-state image capturing device 100 includes an image capturing unit 110, a capture processing unit 120, a first Deep-Neural-Network (DNN) processing unit 130, a first storage 140, a first control unit 150, a selector 160, a communication I/F 170, and a communication controlling unit 180.

Figure 3:
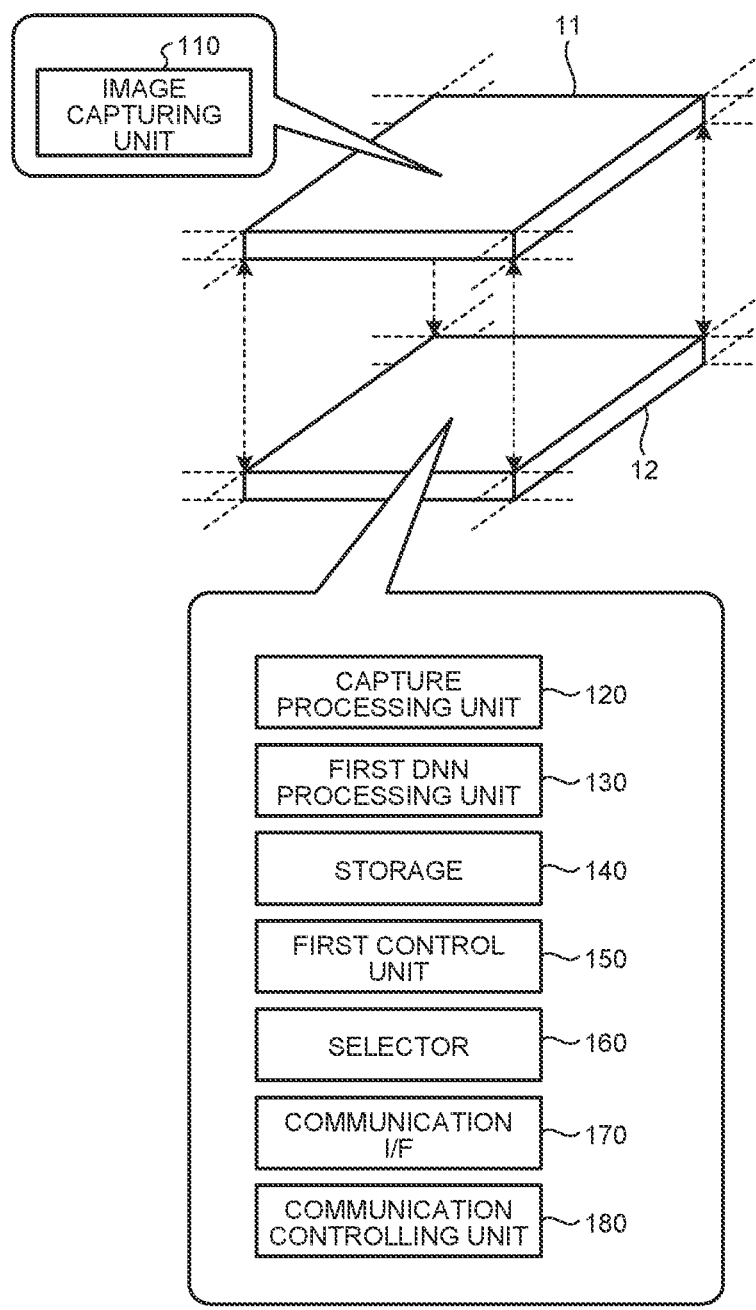
FIG. 3 is a diagram illustrating one example of a laminate structure of a solid-state image capturing device according to the first embodiment of the present disclosure.

FIG. 3 is a diagram illustrating one example of a laminate structure of the solid-state image capturing device 100 according to the first embodiment. As illustrated in FIG. 3, the solid-state image capturing device 100 has a laminate structure obtained by bonding a rectangular first substrate 11 and a rectangular second substrate 12 together, for example.

The first substrate 11 and the second substrate 12 may be bonded together by a Chip on Chip type (CoC type) in which each of the first substrate 11 and the second substrate 12 is separated into tips, and then the first substrate 11 and the second substrate 12 that have been separated into tips are bonded together, for example. One (for example, first substrate 11) of the first substrate 11 and the second substrate 12 may be separated into tips and then the first substrate 11 having been separated into tips may be bonded to the second substrate 12 that is not separated into tips (namely, in wafer state), in other words, the first substrate 11 and the second substrate 12 may be bonded together by a Chip on Wafer type (CoW type). Moreover, the first substrate 11 and the second substrate 12 may be bonded together in a state where both of the first substrate 11 and the second substrate 12 are in a wafer state, namely, may be bonded by a Wafer on Wafer type (WoW type).

For a method for bonding the first substrate 11 and the second substrate 12 together, plasma binding and the like may be employed, for example. Not limited thereto, various bonding methods may be employed.

A size of the first substrate 11 and that of the second substrate 12 may be equal to each other, or may be different from each other. For example, the first substrate 11 and the second substrate 12 may be semiconductor substrates such as silicon substrates.

On the first substrate 11, the image capturing unit 110 among the configuration elements of the solid-state image capturing device 100 illustrated in FIG. 1 may be arranged, for example.

On the second substrate 12, the capture processing unit 120, the first DNN processing unit 130, the first storage 140, the first control unit 150, the selector 160, the communication I/F 170, and the communication controlling unit 180 among the configuration elements of the solid-state image capturing device 100 illustrated in FIG. 1 may be arranged, for example.

In other words, the image capturing unit 110 of the solid-state image capturing device 100 has a configuration in which the image capturing unit 110 is laminated and mounted on configuration elements other than the image capturing unit 110.

Again, with reference to FIG. 1. The image capturing unit 110 includes, for example, an optical system including a zoom lens, a focus lens, a diaphragm, and the like; and a pixel array unit having a configuration in which unit pixels, each of which includes a light receiving element such as a photodiode, are arrayed in two-dimensional matrix. Light having been made incident on from the outside goes through the optical system so as to form an image on a light receiving surface of the pixel array unit on which light receiving elements are arrayed. Each of the unit pixels of the pixel array unit photo-electrically converts light having been made incident on a light receiving element thereof so as to generate image data according to a light amount of the incident light. The image capturing unit 110 outputs the captured image data to the capture processing unit 120.

The capture processing unit 120 converts image data into digital image data, for example. The capture processing unit 120 executes "preprocessing", "data extension", and "data normalization" on the image data having been converted into digital data, for example. The preprocessing is a process that is executed on the image capturing unit 110 during estimation and learning, and includes processes such as de-warping, cropping, lens shading correction, downscaling, and downscaling. The data extension is a process that is executed on the image data during learning, and includes processes for, for example, changing a length-to-width ratio of image data, moving image data in parallel, rotating image data, inverting image data, geometrically deforming image data, and the like. Moreover, the data extension includes processes for changing light and shade of colors of image data and changing colors of image data, for example. Furthermore, the data extension includes a process for adding noise to image data, for example. The data normalization is a process that is executed on image data during estimation and learning, and includes processes for setting average of pixel values of image data to zero, setting dispersion of pixel values to one, and setting a correlation between components to zero so as to whiten image data, for example. The capture processing unit 120 outputs, to the first DNN processing unit 130 and the selector 160, digital image data on which the various processes have been executed.

The first DNN processing unit 130 executes, on image data input thereto from the capture processing unit 120, a DNN on the basis of a DNN model stored in the first storage 140, for example, so as to execute a recognition process of an object included in the image data. Specifically, on image data received from the capture processing unit 120, the first DNN processing unit 130 executes a first DNN, and executes a part of an algorithm constituting a DNN model so as to generate an execution result. The above-mentioned execution result may be referred to as a feature map and a map, or may be simply referred to as an image and the like. The first DNN processing unit 130 executes the first DNN on image data so as to generate a map of an intermediate layer and first result. More specifically, the first DNN processing unit 130 outputs, as the first result, an intermediate layer map of whole of the input image data and an intermediate layer map of a part of the input image data (for example, intermediate layer map on which Region Of Interest (ROI) is executed). The first DNN processing unit 130 may output both of the whole intermediate map and the partial intermediate map, or may be output one of the intermediate maps. The first DNN processing unit 130 calculates, as first result, ROI information and existence probability of an object. When execution of the first DNN has been completed, the first DNN processing unit 130 outputs a completion notification to the first control unit 150. The first DNN processing unit 130 outputs first result to the selector 160.

Specifically, the first DNN processing unit 130 executes, on image data received from the capture processing unit 120, for example, a convolution operation, bias addition, an activation operation, and a pooling process so as to perform an object detecting process.

As an activation function employed by the first DNN processing unit 130 in the activation operation, for example, there may be exemplified an identity function, a sigmoid function, a softmax function, a step function, a ReLU function, a Tanh function, and the like; however, not limited thereto.

For example, during learning, the first DNN processing unit 130 calculates an error and a value of a loss function. The first DNN processing unit 130 calculates an error of a target DNN model by using a method such as a method for gradient descent, a method for stochastic gradient descent, a Newton method, a quasi-Newton method, and an error backpropagation method. The first DNN processing unit 130 calculates a value of the loss function by using a method such as a least square error and a cross entropy error.

The first storage 140 stores therein at least one DNN model to be executed in the first DNN processing unit 130, for example. The first storage 140 may be realized by using a semiconductor memory element such as a Random Access Memory (RAM), a Read Only Memory (ROM), and a Flash Memory.

The first control unit 150 controls the first DNN processing unit 130, for example. Specifically, for example, the first control unit 150 controls the first DNN processing unit 130 so as to execute interruption or stop of first DNN. The first control unit 150 generates first control information, for example. The first control unit 150 transmits the first control information to the information processing device 200, for example. The first control information includes information on a first DNN executed by the first DNN processing unit 130 among DNN algorithms to be executed on image data, for example. The first control information includes a synchronization signal, for example. The first control unit 150 transmits, to the information processing device 200, an execution completion notification of the first DNN processing unit 130, for example. The first control unit 150 receives second control information from a second control unit 250 of the information processing device 200, for example. In this case, the first control unit 150 controls the first DNN processing unit 130 on the basis of the second control information, for example. Incidentally, the first control unit 150 may control the first DNN processing unit 130 so as to execute a DNN algorithm on image data in a pipelined manner. Specifically, the first control unit 150 may control the first DNN processing unit 130 so as to execute, after execution of first DNN on specific image data and before being informed of completion of execution of a second DNN process on the specific image data, a first DNN on the next image data. Thus, according to the present embodiment, it is possible to effectively execute DNN processes on a plurality of pieces of image data captured by the image capturing unit 110, for example.

The selector 160 receives, from the capture processing unit 120, digital image data on which various processes have been executed, for example. The selector 160 receives first result from the first DNN processing unit 130, for example. The selector 160 selectively outputs, to the communication I/F 170, data received from the capture processing unit 120 and the first DNN processing unit 130 in accordance with a control signal transmitted from a control unit of a selector (not illustrated), for example.

The communication I/F 170 includes a transmitting unit 171 and a reception unit 172. The solid-state image capturing device 100 transmits data to the information processing device 200 via the transmitting unit 171. The solid-state image capturing device 100 receives data from the information processing device 200 via the reception unit 172.

The communication controlling unit 180 controls the communication I/F 170. Thus, the communication I/F 170 transmits data to the information processing device 200, and receives data from the information processing device 200. The communication controlling unit 180 may encrypt data, for example. When encryption is executed, the communication controlling unit 180 may use a common key encryptosystem such as a Data Encryption Standard (DES) and an Advanced Encryption Standard (AES). The communication controlling unit 180 may use a cryptography mode such as an Electronic Codebook (ECB), a Cipher Block Chaining (CBC), a Cipher Feedback (CFB), an Output Feedback (OFB), and a Counter (CTR).

The information processing device 200 includes a communication I/F 210, a communication controlling unit 220, a second DNN processing unit 230, a second storage 240, and the second control unit 250. In the first embodiment, the information processing device 200 is an application processor, for example.

The communication I/F 210 includes a reception unit 211 and a transmitting unit 212. The information processing device 200 receives data from the solid-state image capturing device 100 via the reception unit 211. The information processing device 200 transmits data to the solid-state image capturing device 100 via the transmitting unit 212.

The communication controlling unit 220 controls the communication I/F 210. Thus, the communication I/F 210 transmits data to the information processing device 200, and receives data from the information processing device 200. The communication controlling unit 220 may encrypt data so as to communicate with the solid-state image capturing device 100, for example. When encryption is executed, the communication controlling unit 220 may use a common key encryptosystem such as DES and AES. The communication controlling unit 220 may use a cryptography mode such as ECB, CBC, CFB, OFB, and CTR.

The second DNN processing unit 230 executes, on the basis of a DNN model stored in the second storage 240, for example, DNN on first result input from the solid-state image capturing device 100 so as to execute a recognition process of an object included in image data. Specifically, the second DNN processing unit 230 executes a second DNN on the first result having received from the solid-state image capturing device 100 so as to execute remaining part among algorithms constituting a DNN model, which is not executed in the first DNN. Thus, the second DNN processing unit 230 outputs second result. Specifically, the second DNN processing unit 230 recognizes, as second result, an object included in image data. The second DNN processing unit 230 merges the first result and the second result with each other so as to execute ROI and an object classification, for example. When execution of the second DNN has been completed, the second DNN processing unit 230 outputs a completion notification to the second control unit 250. The second DNN processing unit 230 outputs second result to an external device, for example.

Specifically, for example, the second DNN processing unit 230 executes, on image data received from the capture processing unit 120, a convolution operation, bias addition, an activation operation, and a pooling process so as to execute an object detecting process.

As an activation function used by the second DNN processing unit 230 in the activation operation, there may be exemplified an identity function, a sigmoid function, a softmax function, a step function, a ReLU function, and a Tanh function, for example.

For example, during learning, the second DNN processing unit 230 calculates an error and a value of a loss function. The second DNN processing unit 230 calculates an error of a target DNN model by using a method such as a method for gradient descent, a method for stochastic gradient descent, a Newton method, a quasi-Newton method, and an error backpropagation method. The second DNN processing unit 230 calculates a value of a loss function by using a method such as a least square error and a cross entropy error.

The second storage 240 stores therein at least one DNN model to be executed by the second DNN processing unit 230, for example. A DNN model stored in the first storage 140 of the solid-state image capturing device 100 and a DNN model stored in the second storage 240 are combined with each other so as to constitute one DNN algorithm. Thus, one DNN algorithm is executed by using two devices of the solid-state image capturing device 100 and the information processing device 200. In other words, in the present embodiment, one DNN algorithm is able to be divided into the two devices of the solid-state image capturing device 100 and the information processing device 200 to be executed. The second storage 240 is able to be realized by a semiconductor memory element such as RAM, ROM, and a flash memory.

The second control unit 250 controls the second DNN processing unit 230, for example. Specifically, the second control unit 250 controls the second DNN processing unit 230 so as to execute interruption or stop of a second DNN, for example. The second control unit 250 receives first control information from the first control unit 150 of the solid-state image capturing device 100, and controls the second DNN processing unit 230 on the basis of the received first control information, for example. The second control unit 250 generates second control information, for example. The second control unit 250 transmits the generated second control information to the solid-state image capturing device 100, for example. The second control information includes information on a second DNN that is executed on the first result by the second DNN processing unit 230, for example. The second control information includes a synchronization signal, for example. The second control unit 250 transmits an execution completion notification of the second DNN processing unit 230 to the solid-state image capturing device 100, for example. The second control unit 250 may control the second DNN processing unit 230 so as to execute a DNN algorithm on image data in a pipelined manner. Specifically, the second control unit 250 executes a second DNN on a specific first result so as to generate second result. The second result may be transmitted to a processing device other than the second DNN processing unit 230, and the second DNN processing unit 230 may be controlled so as to execute a second DNN on the next first result before receiving, from the other processing device, a completion notification of the process executed on the second result. Thus, according to the present embodiment, it is possible to effectively execute DNN processes on a plurality of first results.

Figure 4:
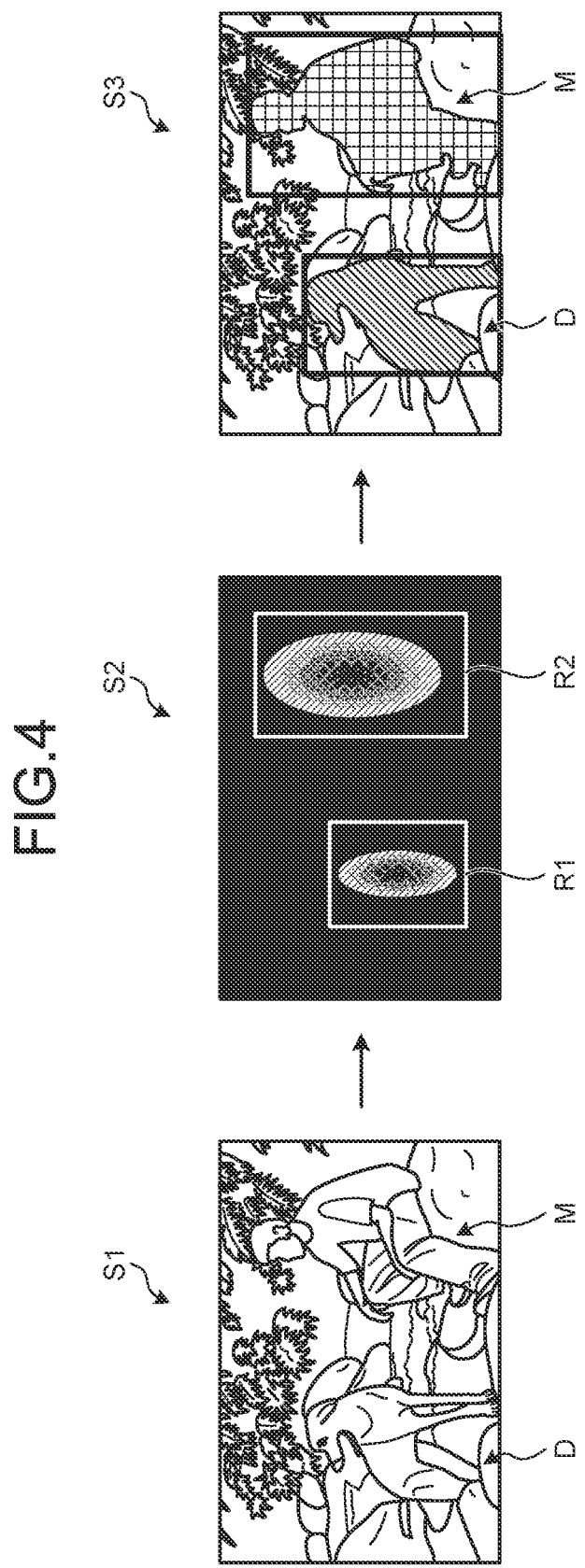
FIG. 4 is a diagram illustrating processes of the solid-state image capturing system according to the first embodiment of the present disclosure.

With reference to FIG. 4, processes of the first DNN processing unit 130 and the second DNN processing unit 230 will be explained. FIG. 4 is a diagram illustrating processes of the first DNN processing unit 130 and the second DNN processing unit 230.

First, the first DNN processing unit 130 receives image data from the capture processing unit 120 (Step S1). The first DNN processing unit 130 receives image data including a dog D and a man M, for example.

Next, the first DNN processing unit 130 executes a first DNN on the image data received in Step S1 (Step S2). Herein, the first DNN processing unit 130 executes a first DNN on image data so as to generate, as first result, a feature map such as an intermediate layer. In the feature map, it is indicated that there present some kind of objects in a region R1 and a region R2 with high probability. The first DNN processing unit 130 output the feature map to the second DNN processing unit 230. The first DNN processing unit 130 may output whole of the feature map to the second DNN processing unit 230, or may output a feature map corresponding to the region R1 and the region R2 alone. In other words, the first DNN processing unit 130 encodes image data captured by the image capturing unit 110, and outputs the encoded image data to the second DNN processing unit 230. Thus, data output from the first DNN processing unit 130 does not include original image data of the dog D and the man M captured by the image capturing unit 110, so that it is possible to protect personal information. Furthermore, volume of a feature map is smaller than that of image data, so that it is possible to reduce data amount transmitted from the solid-state image capturing device 100 to the information processing device 200.

The second DNN processing unit 230 executes a second DNN on the feature map (first result) that is obtained in Step S2 (Step S3). Thus, the second DNN processing unit 230 is capable of recognizing that there presents the dog D in the region R1 of the feature map and there presents the man M in the region R2 of the feature map.

In other words, in the present embodiment, the first DNN processing unit 130 executes a part of a DNN algorithm, and the second DNN processing unit 230 executes remaining part thereof so as to execute a recognition process of an object included in image data. In other words, two DNN processing units of the first DNN processing unit 130 and the second DNN processing unit 230 execute one DNN algorithm.

[1-2. Configuration of DNN Algorithm]

Figure 5:
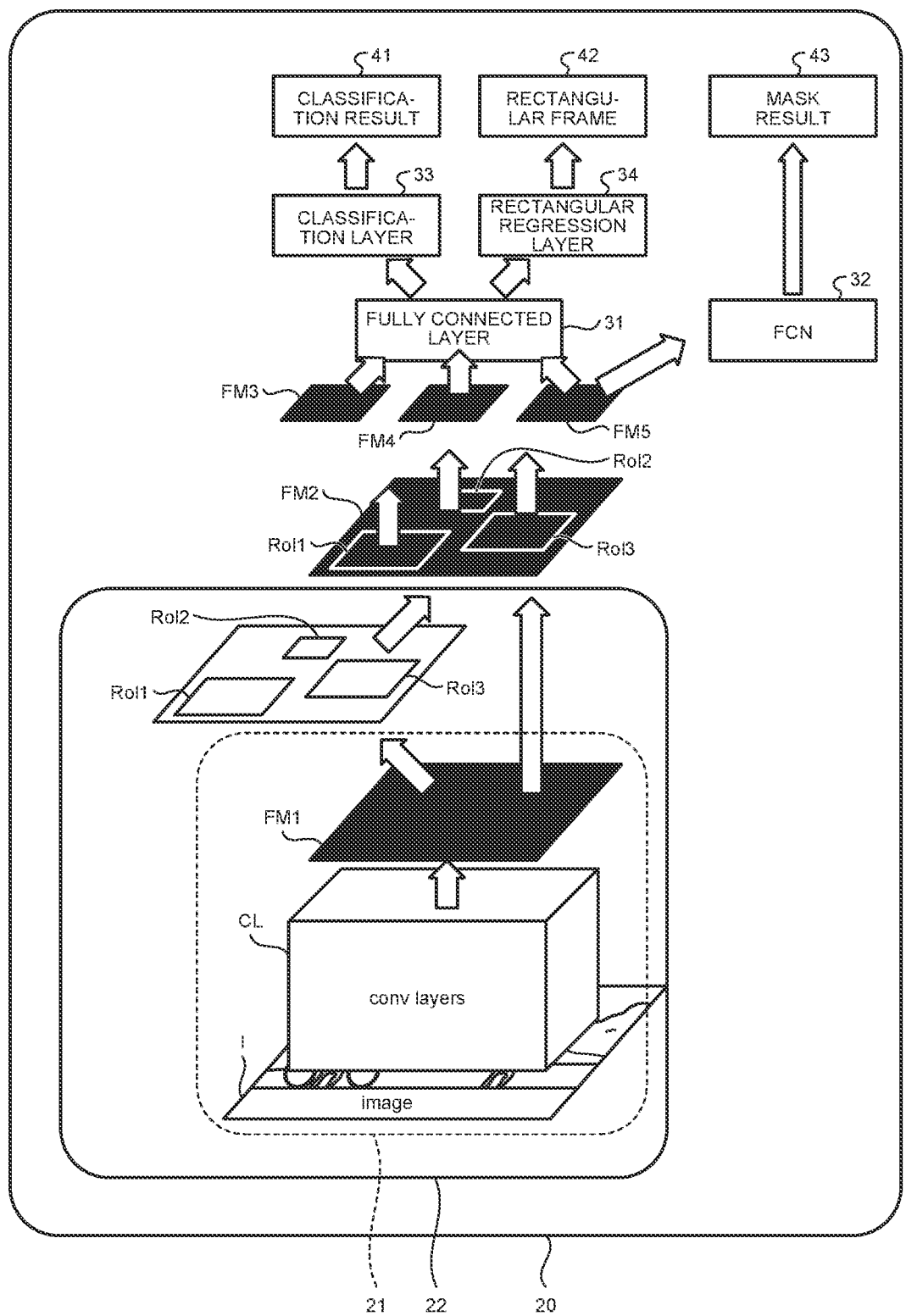
FIG. 5 is a diagram illustrating a configuration of a Deep-Neural-Network (DNN) algorithm.

With reference to FIG. 5, a configuration example of a DNN algorithm will be explained. FIG. 5 is a diagram illustrating a configuration example of a DNN algorithm.

FIG. 5 is a diagram illustrating one example of a structure of an object detecting algorithm 20.

First, the object detecting algorithm 20 executes a Convolutional Neural Network (CNN) on image data. Specifically, image data I is input to a convolution layer CL. The convolution layer CL executes a CNN on whole of the image data I so as to output a feature map FM1. The processes so far are image processing using a CNN 21.

In the next step, an object-region recognizing algorithm is executed on the feature map FM1. The object-region recognizing algorithm is executed on a feature map FM so as to extract a candidate region in which there presents an object included in a feature map. Specifically, in the example illustrated in FIG. 5, RoI1, RoI2, and RoI3 are extracted, from the feature map FM1, as candidate regions in which there presents an object. The processes so far are image processing using an object-region recognizing algorithm 22.

In the next step, RoI1, RoI2, and RoI3 are superposed on the feature map FM1 to generate an RoI feature map FM2, and the generated RoI feature map FM2 is stored in a Pooling layer. A RoI pooling layer executes RoI pooling on the feature map FM1 on which RoI1, RoI2, and RoI3 are superposed. The RoI pooling is a process for extracting regions including RoI1, RoI2, and RoI3 as individual feature maps. Thus, regions including RoI1, RoI2, and RoI3 are respectively extracted as a feature map FM3, a feature map FM4, and a feature map FM5. The feature map FM3, the feature map FM4, and the feature map FM5 are input to a fully connected layer 31.

In the next step, a classification layer 33 and a rectangular regression layer 34 share the feature map FM3, the feature map FM4, and the feature map FM5 that are input to the fully connected layer 31 with each other.

The classification layer 33 classifies types of objects included in the feature map FM3, the feature map FM4, and the feature map FM5. The classification layer 33 outputs a classification result 44. The rectangular regression layer 34 generates a rectangle that surrounds an object included in the feature map FM3, the feature map FM4, and the feature map FM5.

The feature map FM3, the feature map FM4, and the feature map FM5 are input to a Fully Convolution Network (FCN) 32 in parallel with processing of the classification layer 33 and the rectangular regression layer 34. Specifically, RoIAlign is executed by a RoIAlign layer on the feature map FM3, the feature map FM4, and the feature map FM5 to be input to the FCN 32. The RoIAlign is a process for correcting, by using a bilinear interpolation method, a round-off error that occurs when the RoI feature map FM2 is generated from the image data I.

The FCN 32 is configured to classify an object included in a feature map, generate a rectangle that surrounds an object, and execute masking on an object for each of the feature map FM3, the feature map FM4, and the feature map FM5. The FCN 32 outputs a classification result 41, a rectangular frame 42, and a mask result 43 for each of the feature maps. The processes so far are the object detecting algorithm 20.

In the present embodiment, the first DNN processing unit 130 and the second DNN processing unit 230 may execute processes that are arbitrarily divided from the processes included in the DNN algorithm illustrated in FIG. 5 as long as the processes are divided to be executed. For example, the first DNN processing unit 130 may execute processes up to the process for generating the feature map FM1, and the second DNN processing unit 230 may execute remaining processes. For example, the first DNN processing unit 130 may execute, in the object detecting algorithm 20, processes up to the process for extracting the feature map FM3, the feature map FM4, and the feature map FM5; and the second DNN processing unit 230 may execute the process of the FCN 32 alone. Processes to be executed by the first DNN processing unit 130 may be arbitrarily decided. For example, which process is to be executed by the first DNN processing unit 130 may be decided in accordance with performance of the first DNN processing unit 130.

Figure 6:
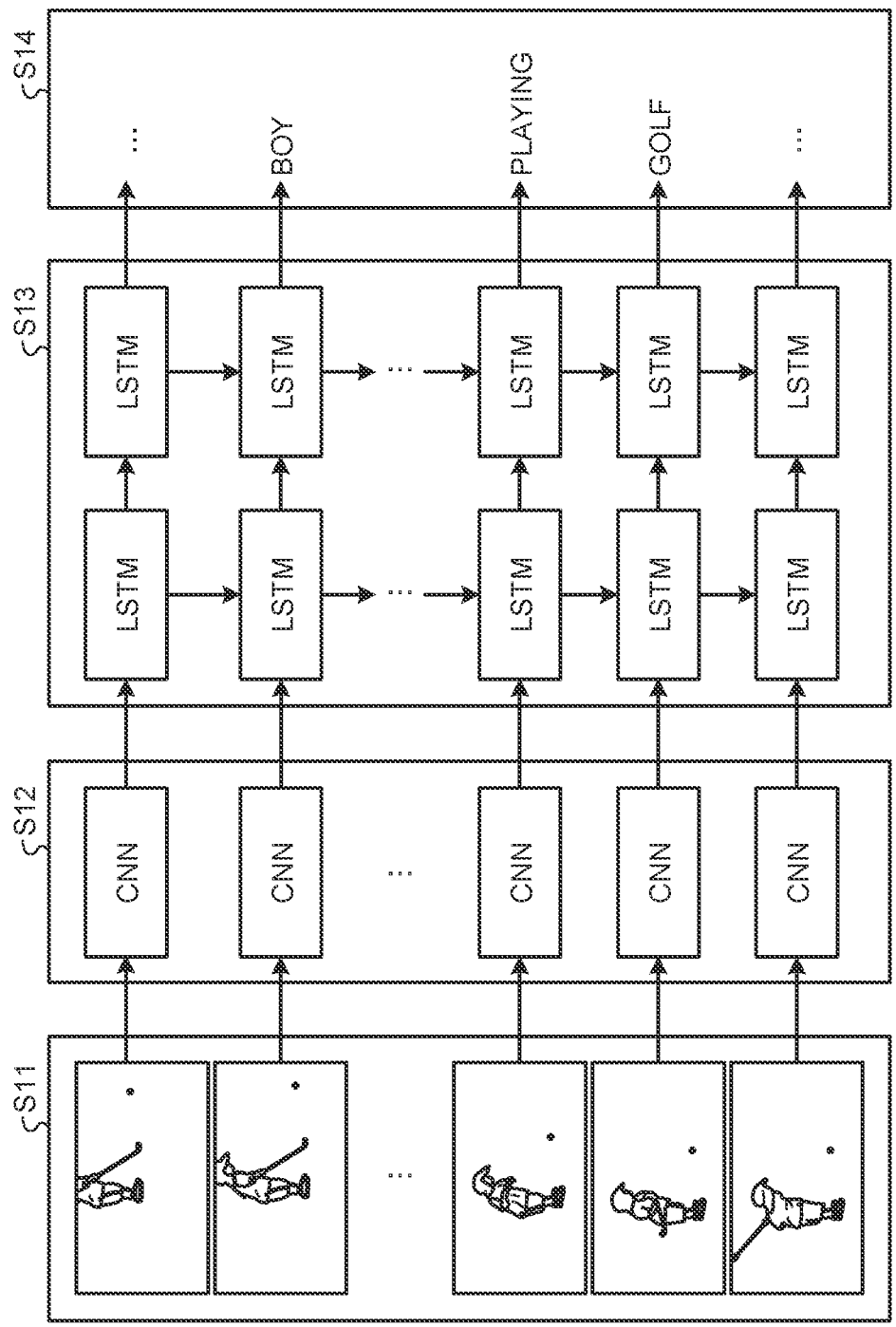
FIG. 6 is a diagram illustrating one example of a dividing process of the DNN algorithm.

With reference to FIG. 6, one example of processes to be executed by the first DNN processing unit 130 and the second DNN processing unit 230 will be explained. FIG. 6 is a diagram illustrating one example of processes to be executed by the first DNN processing unit 130 and the second DNN processing unit 230.

First, in the process illustrated in FIG. 6, for example, a plurality of pieces of image data is input to the first DNN processing unit 130 from the capture processing unit 120 (Step S11).

Next, the first DNN processing unit 130 executes an image recognizing process on the image data received from the capture processing unit 120 so as to recognize an object included in image data (Step S12). Specifically, the first DNN processing unit 130 executes CNN on each piece of image data so as to recognize an object included in image data. The first DNN processing unit 130 generates metadata from an execution result of CNN for each piece of image data.

Next, the second DNN processing unit 230 recognizes, by using a Recurrent Neural Network (RNN), relationship of metadata generated by the first DNN processing unit 130 (Step S13). Specifically, the second DNN processing unit 230 recognizes relationship of metadata by using a Long short-term memory (LSTM) network.

The second DNN processing unit 230 recognizes relationship of metadata so as to execute captioning (Step S14). For example, the second DNN processing unit 230 executes captioning on image data, such as "boy", "playing", and "golf".

As described above, when object recognition and LSTM are combined with each other, relationship between image frames is able to be recognized. In this case, in the present embodiment, object recognition is executed by the first DNN processing unit 130 and LSTM is executed by the second DNN processing unit 230, and single DNN algorithm is divided and executed. Herein, the case has been explained in which a plurality of still images is input, in the present embodiment, similarly thereto, the recognition process may be executed on videos.

[1-3. Process of Solid-State Image Capturing System According to First Embodiment]

Figure 7:
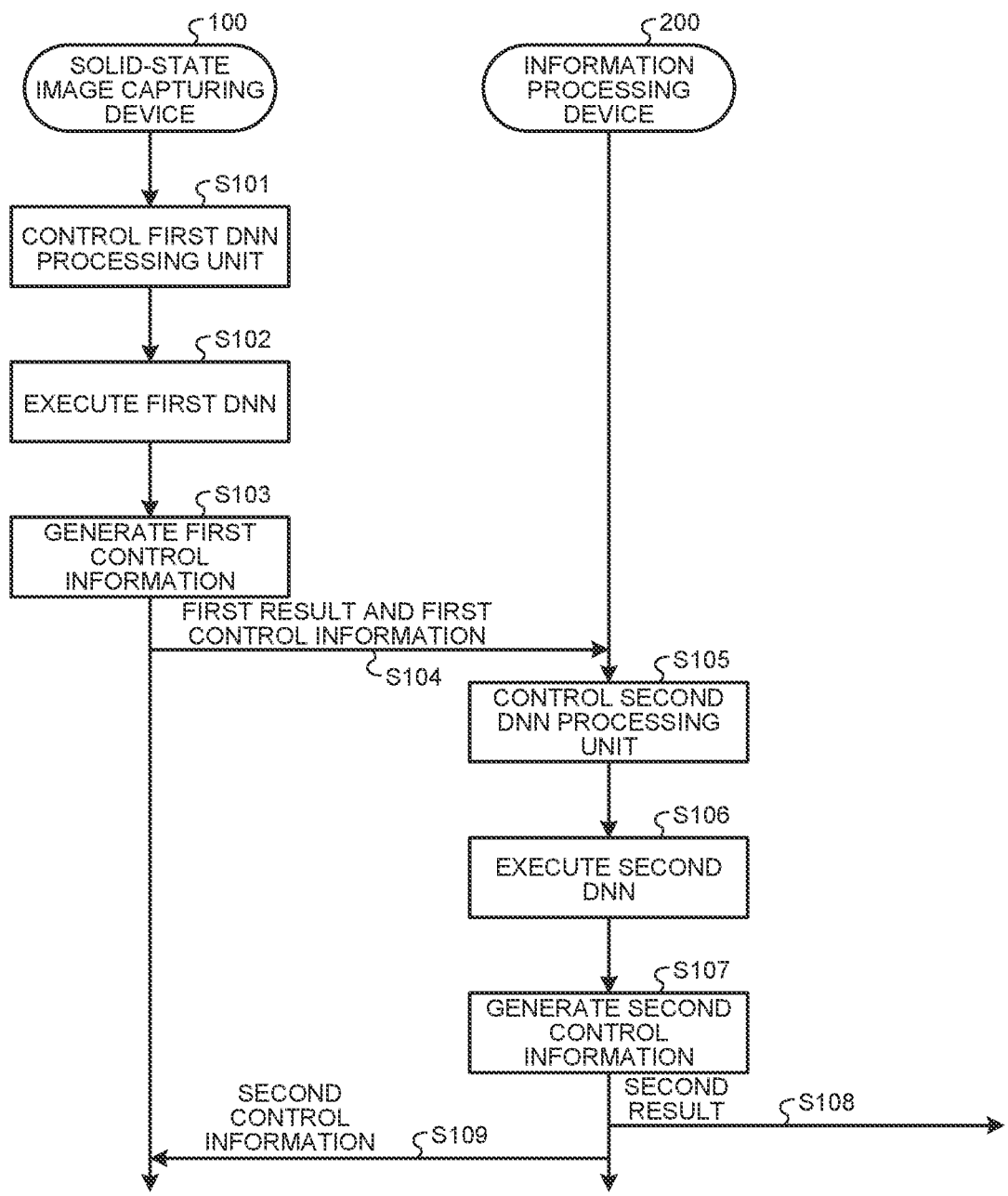
FIG. 7 is a sequence diagram illustrating one example of a processing procedure of the solid-state image capturing system according to the first embodiment of the present disclosure.

With reference to FIG. 7, processes of the solid-state image capturing device 100 and the information processing device 200 will be explained. FIG. 7 is a sequence diagram illustrating flows of processing of the solid-state image capturing device 100 and the information processing device 200.

First, the solid-state image capturing device 100 controls the first DNN processing unit 130 (Step S101). Specifically, the solid-state image capturing device 100 causes the first control unit 150 to control the first DNN processing unit 130.

Next, the solid-state image capturing device 100 executes a first DNN on input image data (Step S102). Specifically, the solid-state image capturing device 100 causes the first DNN processing unit 130 to execute a first DNN on input image data, and outputs first result.

Next, the solid-state image capturing device 100 generates first control information (Step S103). Specifically, the solid-state image capturing device 100 causes the first control unit 150 to generate first control information.

Next, the solid-state image capturing device 100 transmits the first result and the first control information to the information processing device 200 (Step S104). Specifically, the solid-state image capturing device 100 causes the transmitting unit 171 to transmit the first result and the first control information to the information processing device 200. The transmitting unit 171 may transmit the first result to the information processing device 200 before execution of the second DNN processing unit 230.

Next, the information processing device 200 controls the second DNN processing unit 230 (Step S105). Specifically, on the basis of the first control information, the information processing device 200 causes the second control unit 250 to control the second DNN processing unit 230.

Next, the information processing device 200 executes a second DNN on the first result (Step S106). Specifically, the information processing device 200 causes the second DNN processing unit 230 to execute a second DNN so as to generate second result.

Next, the information processing device 200 generates second control information (Step S107). Specifically, the information processing device 200 causes the second control unit 250 to generate the second control information.

Next, the information processing device 200 transmits the second result to an external device (Step S108). Specifically, the information processing device 200 causes the second DNN processing unit 230 to transmit the second result to an external device. Note that in Step S108, the case has been explained in which the information processing device 200 transmits the second result to the external device; however, this is merely one example, and not intending to limit the present disclosure. For example, in Step S108, the information processing device 200 may hold the second result without outputting the second result to the external device.

The information processing device 200 transmits second control information to the solid-state image capturing device 100 (Step S109). Specifically, the information processing device 200 causes the transmitting unit 212 to transmit second control information to the solid-state image capturing device 100.

Figure 8:
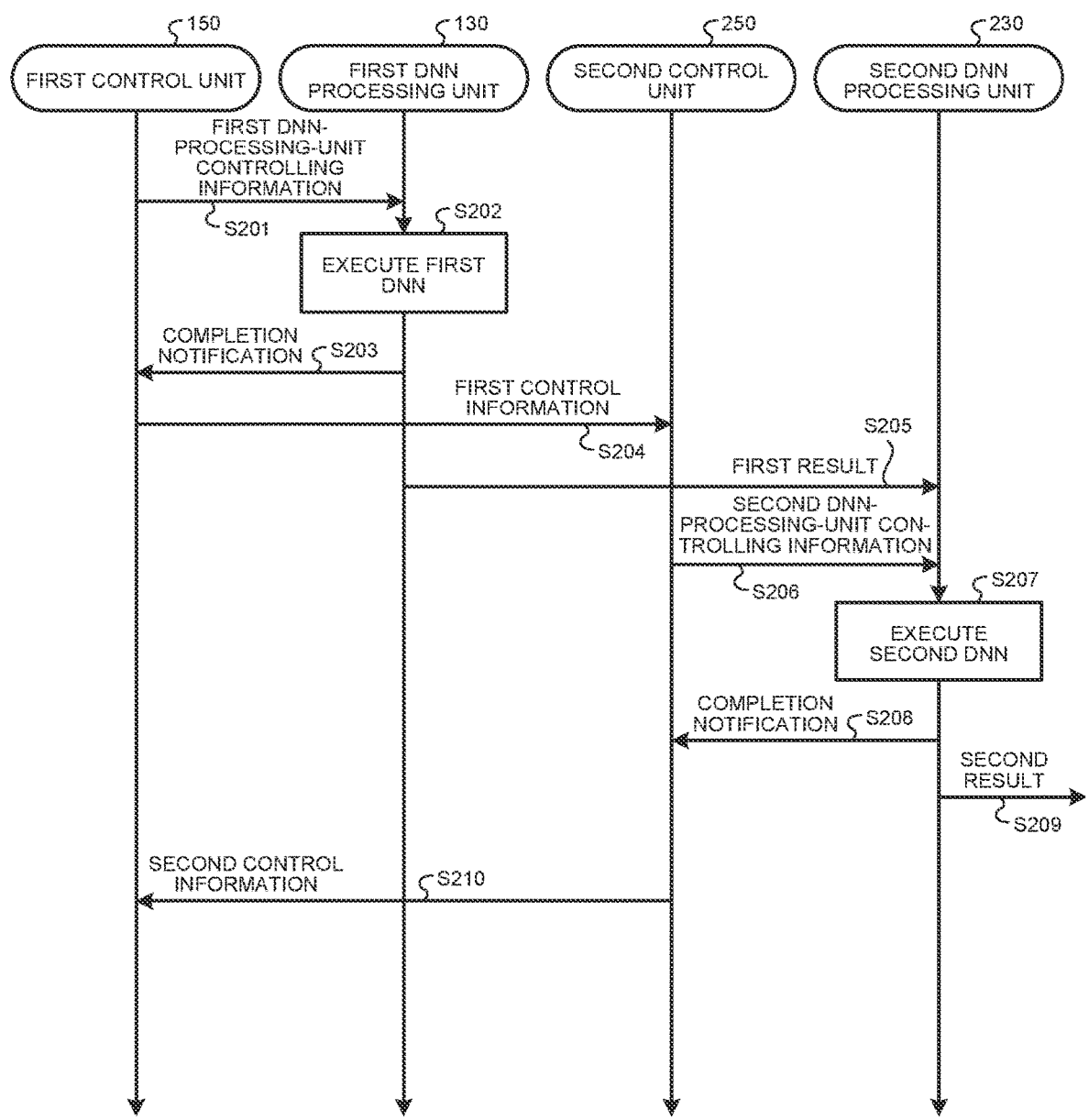
FIG. 8 is a sequence diagram illustrating one example of a processing procedure to be executed by a control unit and a DNN processing unit of each of the solid-state image capturing device and an information processing device according to the first embodiment of the present disclosure.

With reference to FIG. 8, the processing of the solid-state image capturing device 100 and the information processing device 200 will be more specifically explained. FIG. 8 is a sequence diagram illustrating one example of a processing procedure to be executed by the first DNN processing unit 130, the first control unit 150, the second DNN processing unit 230, and the second control unit 250.

First, the first control unit 150 outputs first DNN-processing-unit controlling information to the first DNN processing unit 130 (Step S201). By using the first DNN-processing-unit controlling information, the first control unit 150 causes the first DNN processing unit 130 to execute DNN, interrupt DNN, or stop DNN.

Next, in accordance with first DNN-processing-unit controlling information, the first DNN processing unit 130 executes a first DNN on the input image data (Step S202).

Next, when the execution of the first DNN on the image data has been completed, the first DNN processing unit 130 outputs a completion notification to the first control unit 150 (Step S203).

Next, when receiving a completion notification, the first control unit 150 transmits first control information to the second control unit 250 (Step S204). Specifically, first control information is transmitted from the transmitting unit 171 to the reception unit 211. The second control unit 250 receives first control information from the reception unit 211.

Next, the first DNN processing unit 130 transmits, to the second DNN processing unit 230, first result that is execution result of a first DNN (Step S205). Specifically, first result is transmitted from the transmitting unit 171 to the reception unit 211. The second DNN processing unit 230 receives first result from the reception unit 211.

Next, on the basis of the first control information, the second control unit 250 outputs second DNN-processing-unit controlling information to the second DNN processing unit 230 (Step S206).

Next, in accordance with second DNN-processing-unit controlling information, the second DNN processing unit 230 executes a second DNN on the input first result (Step S207).

Next, when execution of the second DNN on the first result has completed, the second DNN processing unit 230 outputs a completion notification to the second control unit 250 (Step S208).

Next, the second DNN processing unit 230 transmits, to the outside thereof, second result that is an execution result of the second DNN (Step S209). Note that in Step S209, the case has been explained in which the second DNN processing unit 230 transmits second result to the outside thereof; however, this is merely one example, and not intending to limit the present disclosure. For example, in Step S209, the second DNN processing unit 230 may hold the second result without outputting the second result to the outside thereof.

Next, the second control unit 250 transmits second control information to the first control unit 150 (Step S210). Specifically, second control information is transmitted from the transmitting unit 212 to the reception unit 172. The first control unit 150 receives first control information from the reception unit 172.

2. Second Embodiment

[2-1. Configuration of Solid-State Image Capturing System According to Second Embodiment]

Figure 9:
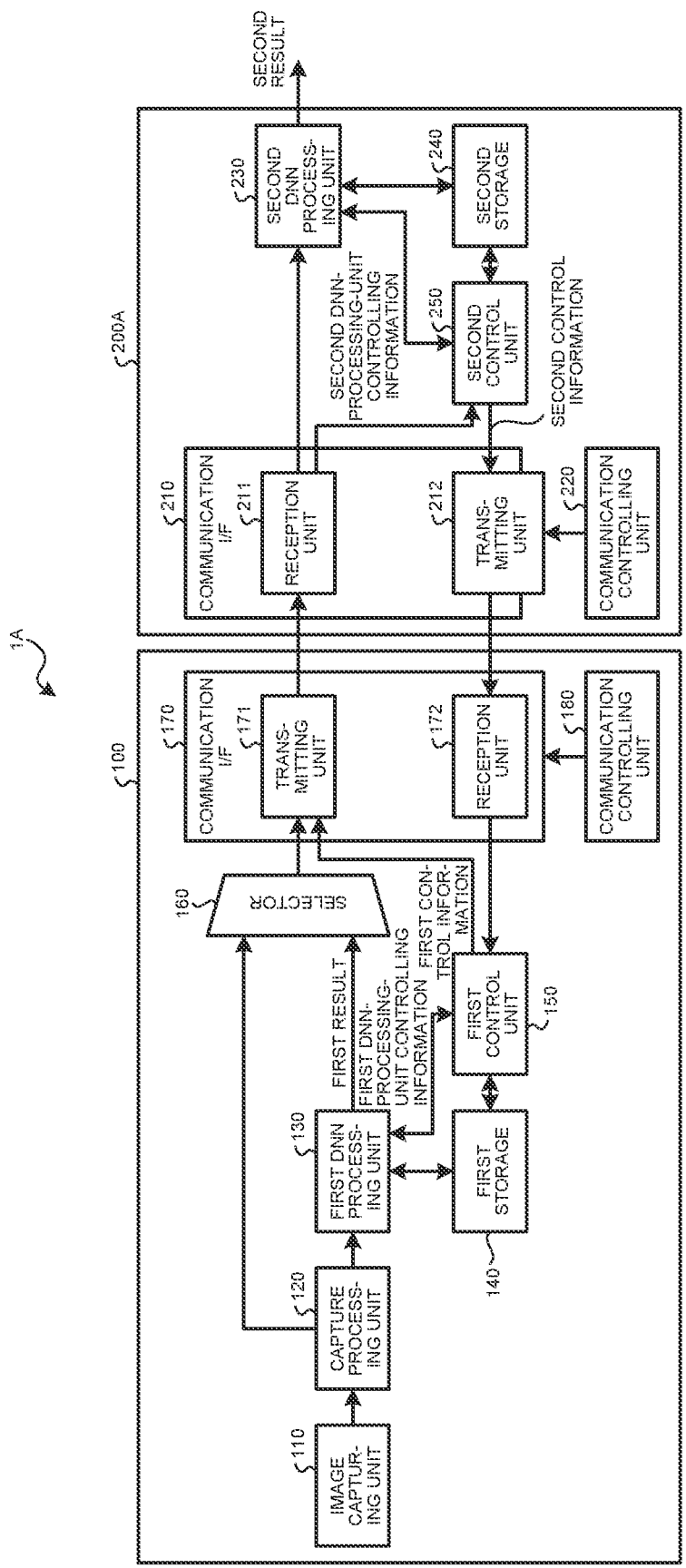
FIG. 9 is a block diagram illustrating one example of a configuration of a solid-state image capturing system according to a second embodiment of the present disclosure.

With reference to FIG. 9, a configuration of a solid-state image capturing system according to a second embodiment will be explained. FIG. 9 is a block diagram illustrating one example of a configuration of the solid-state image capturing system according to the second embodiment.

As illustrated in FIG. 9, a solid-state image capturing system 1A includes the solid-state image capturing device 100 and an information processing device 200A. Configuration elements and operations of devices constituting the solid-state image capturing system 1A are similar to those of the solid-state image capturing system 1 according to the first embodiment, and thus explanation thereof is omitted.

Figure 10:
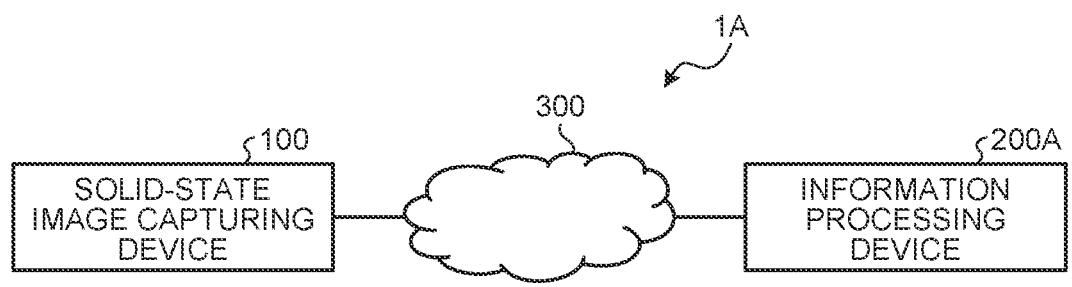
FIG. 10 is a block diagram illustrating one example of a connection relation of the solid-state image capturing system according to the second embodiment of the present disclosure.

As illustrated in FIG. 10, the solid-state image capturing device 100 and the information processing device 200A are connected to be able to communicate with each other via the Internet communication network 300, for example. In this case, it is sufficient that the communication I/F 170 of the solid-state image capturing device 100 and the communication I/F 210 of the information processing device 200A are connected to be able to communicate with each other via the Internet communication network 300. Moreover, the communication I/F 170 of the solid-state image capturing device 100 and the communication I/F 210 of the information processing device 200A may be connected to be able to communicate with each other by using wireless communication. The solid-state image capturing system 1A illustrated in FIG. 10 includes the single solid-state image capturing device 100 and the single information processing device 200A; however, this is merely one example, and not intending to limit the present disclosure. The solid-state image capturing system 1A may include the plurality of solid-state image capturing devices 100 and the plurality of information processing devices 200A. Furthermore, the number of the solid-state image capturing devices 100 and that of the information processing devices 200A included in the solid-state image capturing system 1A may be different from each other. In the second embodiment, the information processing device 200A is a cloud server that is connected to the solid-state image capturing device 100 to be able to communicate with each other via the Internet communication network 300 or in a wireless manner, for example. The solid-state image capturing system 1A may be applied to Factory Automation (FA) or monitoring cameras, for example.

[2-2. Configuration of Modification of Solid-State Image capturing system According to Second Embodiment]

Figure 11:
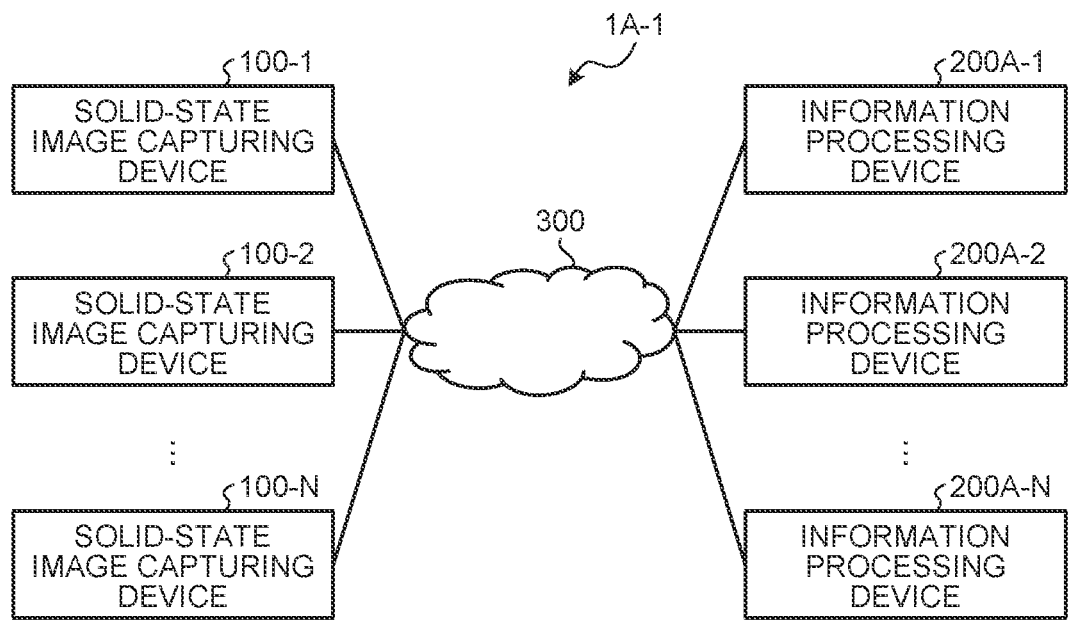
FIG. 11 is a block diagram illustrating one example of a connection relation of the solid-state image capturing system according to the second embodiment of the present disclosure.

With reference to FIG. 11, a modification of the solid-state image capturing system according to the second embodiment of the present disclosure will be explained. FIG. 11 is a diagram illustrating a modification of a connection relation of the solid-state image capturing system according to the second embodiment of the present disclosure.

A solid-state image capturing system 1A-1 includes a solid-state image capturing device 100-1, a solid-state image capturing device 100-2, . . . , and a solid-state image capturing device 100-N (N is integer equal to or more than three) and an information processing device 200A-1, an information processing device 200A-2, . . . , an information processing device 200-N. In other words, in the solid-state image capturing system 1A-1, the plurality of solid-state image capturing devices and the plurality of information processing devices are connected to be able to communicate with each other via the Internet communication network 300. In the solid-state image capturing system 1A-1, the number of the solid-state image capturing devices and the number of information processing devices may be equal to each other, or may be different from each other.

The solid-state image capturing system 1A-1 includes the plurality of solid-state image capturing devices and the plurality of information processing devices; however, this is merely one example, and not intending to limit the present disclosure. For example, the solid-state image capturing system 1A-1 may be constituted of the single solid-state image capturing device and the plurality of information processing devices. Moreover, for example, the solid-state image capturing system 1A-1 may be constituted of the plurality of solid-state image capturing devices and the single information processing device.

3. Hardware Configuration

Figure 12:
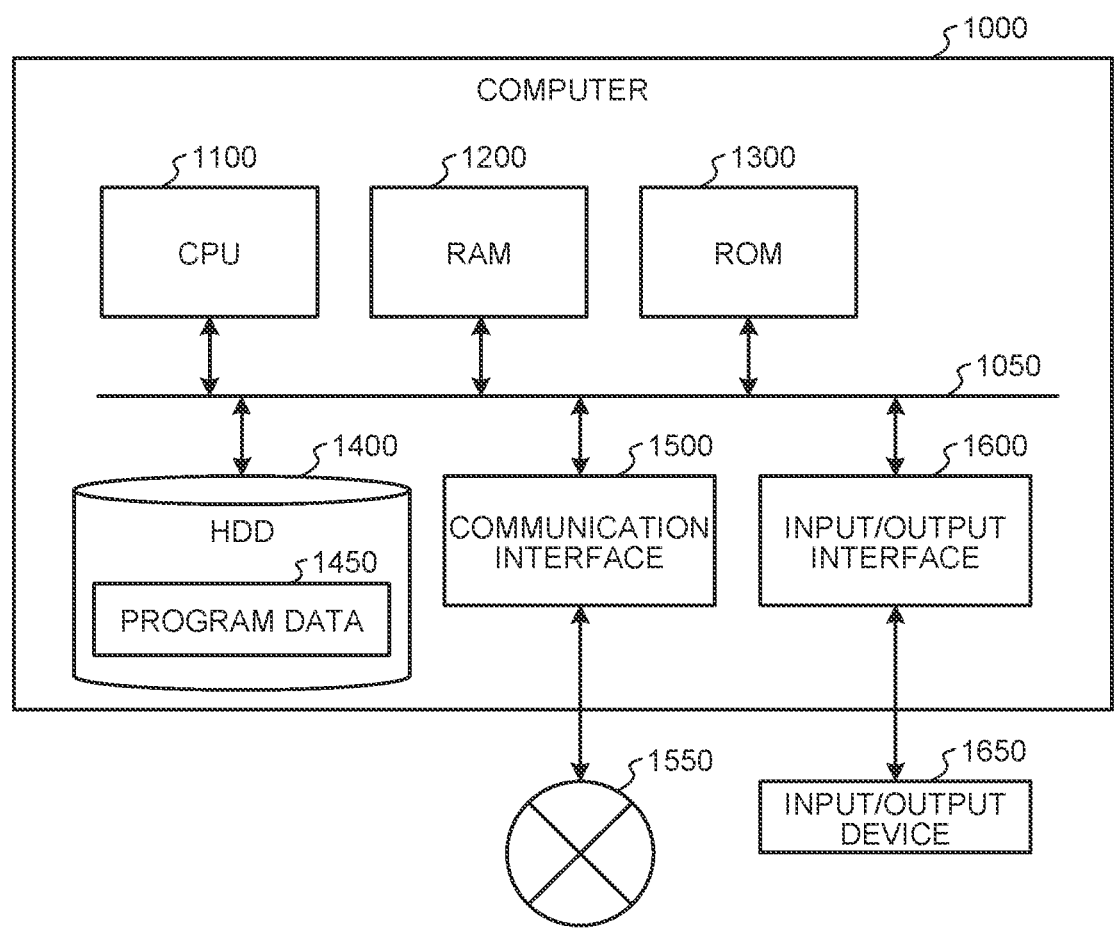
FIG. 12 is a diagram illustrating a hardware configuration of one example of a computer that realizes functions of the solid-state image capturing device and the information processing device according to the present disclosure.

The solid-state image capturing device 100 and the information processing device 200 according to the above-mentioned embodiments are realized by a computer 1000 having a configuration illustrated in FIG. 12, for example. Hereinafter, explanation will be provided while exemplifying the solid-state image capturing device 100 according to the first embodiment. FIG. 12 is a diagram illustrating a hardware configuration of one example of the computer 1000 that realizes functions of the solid-state image capturing device 100. The computer 1000 includes a CPU 1100, a RAM 1200, a Read Only Memory (ROM) 1300, a Hard Disk Drive (HDD) 1400, a communication interface 1500, and an input/output interface 1600. The units of the computer 1000 are connected to each other by a bus 1050.

The CPU 1100 operates on the basis of programs stored in the ROM 1300 or the HDD 1400 so as to control the units. For example, the CPU 1100 expands programs stored in the ROM 1300 or the HDD 1400 into the RAM 1200 so as to execute processes corresponding to the various programs.

The ROM 1300 stores therein a boot program of a Basic Input Output System (BIOS) which is executed by the CPU 1100 at start-up of the computer 1000, and a program depending on hardware of the computer 1000.

The HDD 1400 is a computer-readable recording medium that non-temporarily records therein programs to be executed by the CPU 1100 and data to be used by the programs. Specifically, the HDD 1400 is a recording medium that records a program according to the present disclosure that is one example of program data 1450.

The communication interface 1500 is an interface for the computer 1000 to connect to an external network 1550 (for example, Internet). For example, via the communication interface 1500, the CPU 1100 is configured to receive data from another device, or transmit data generated by the CPU 1100 to another device.

The input/output interface 1600 is an interface for connecting an input/output device 1650 and the computer 1000 to each other. For example, the CPU 1100 receives data from an input device, such as a keyboard and a mouse, via the input/output interface 1600. The CPU 1100 transmit data to an output device such as a display, a speaker, and a printer via the input/output interface 1600. The input/output interface 1600 may function as a media interface that reads a program and the like recorded in predetermined recording medium (media). Herein, the media is, for example, optical storage medium such as a Digital Versatile Disc (DVD) and a Phase change rewritable Disk (PD), magneto-optic recording medium such as a Magneto-Optical disk (MO), tape medium, magnetic recording medium, a semiconductor memory, or the like.

For example, when the computer 1000 functions as the solid-state image capturing device 100 according to the first embodiment, the CPU 1100 of the computer 1000 executes a program loaded on the RAM 1200 so as to realize functions of units constituting the solid-state image capturing device 100. The HDD 1400 stores therein programs according to the present disclosure. The CPU 1100 reads the program data 1450 from the HDD 1400 and executes the read program data 1450; however, in another example, the CPU 1100 may acquire these programs from another device via the external network 1550.

4. Application Example to Endoscopic Surgery System

A technology (present technology) according to the present disclosure may be applied to various products. For example, the technology according to the present disclosure may be applied to an endoscopic surgery system.

Figure 13:
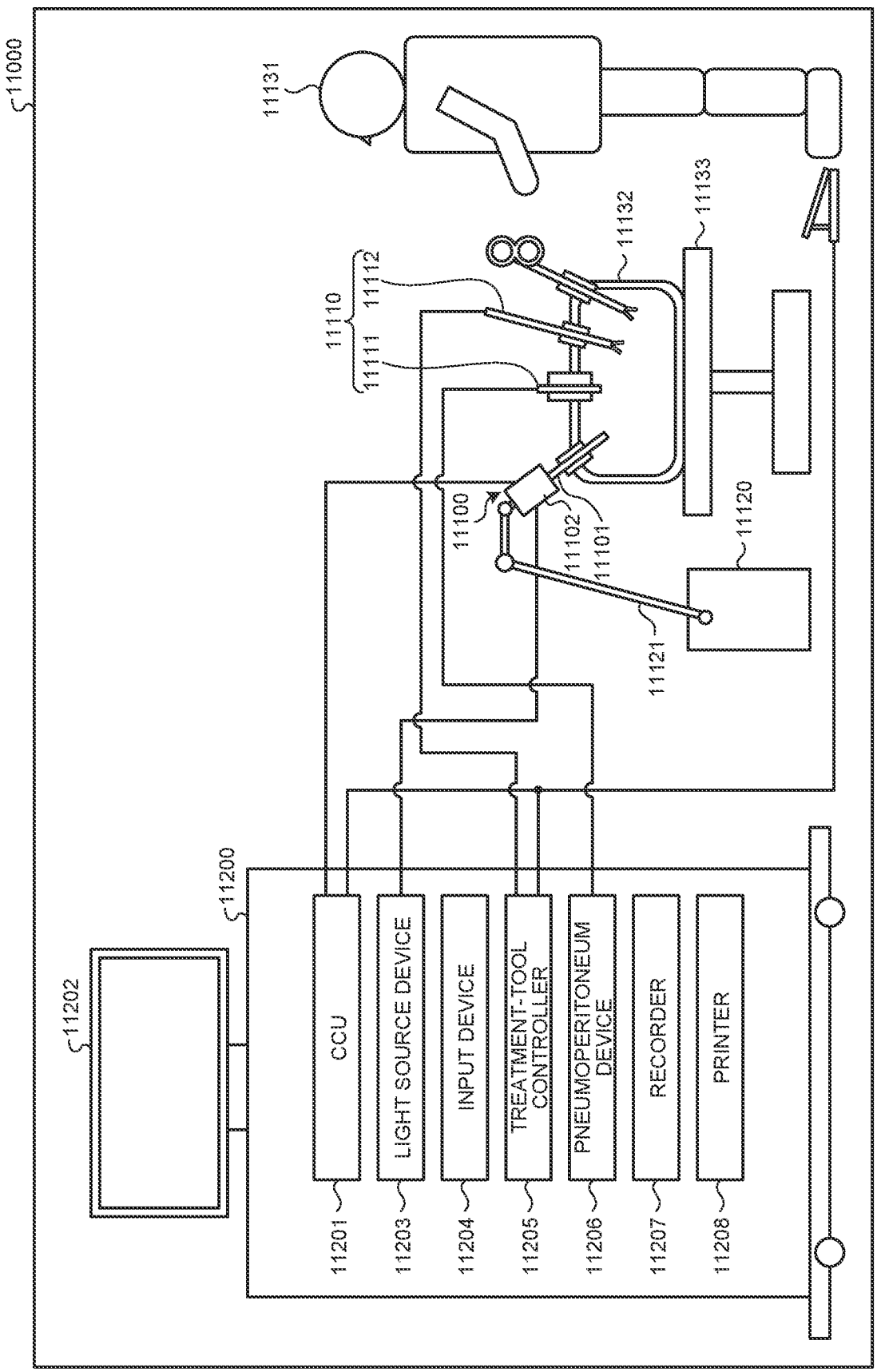
FIG. 13 is a diagram illustrating one example of a schematic configuration of an endoscopic surgery system.

FIG. 13 is a diagram illustrating one example of a schematic configuration of an endoscopic surgery system to which a technology (present technology) according to the present disclosure is applied.

In FIG. 13, there is illustrated a state where an operator (doctor) 11131 performs an operation on a patient 11132 on a patient bed 11133 by using an endoscopic surgery system 11000. As illustrated in FIG. 13, the endoscopic surgery system 11000 is constituted of an endoscope 11100, other surgical instruments 11110 such as a pneumoperitoneum tube 11111 and an energy processing apparatus 11112, a support arm device 11120 that supports the endoscope 11100, and a cart 11200 on which various devices for endoscopic operations are mounted.

The endoscope 11100 is constituted of a lens barrel 11101 whose portion having a predetermined length from its leading end is to be inserted into a body cavity of the patient 11132, and a camera head 11102 that is connected with a base end of the lens barrel 11101. In the illustrated example, there is exemplified the endoscope 11100 configured to be a rigid endoscope including the rigid lens barrel 11101; however, the endoscope 11100 may be configured to be a flexible endoscope including a flexible lens barrel.

A leading end of the lens barrel 11101 is provided with an opening to which an objective lens is fixed. The endoscope 11100 is connected with a light source device 11203, and thus light generated by the light source device 11203 is led to a leading end of the lens barrel via a light guide extending along an inner part of the lens barrel 11101 so as to irradiate, via the objective lens, the generated light toward an observation target in a body cavity of the patient 11132. Note that the endoscope 11100 may be any of a forward-viewing endoscope, a forward-oblique viewing endoscope, and a side-viewing endoscope.

An optical system and an image capturing element are arranged in an inner part of the camera head 11102, reflected light (observation light) from an observation target is condensed to the image capturing element by the optical system. The image capturing element photo-electrically converts the observation light so as to generate an electrical signal corresponding to the observation light, namely, an image signal corresponding to an observation figure. The above-mentioned image signal is transmitted to a Camera Control Unit (CCU) 11201 in a form of RAW data.

The CCU 11201 is constituted of a Central Processing Unit (CPU), a Graphics Processing Unit (GPU), and the like so as to comprehensively control operations of the endoscope 11100 and a display 11202. Moreover, the CCU 11201 receives an image signal from the camera head 11102, and executes, on the image signal, various kinds of image processing for displaying an image that is based on the image signal, such as a developing process (demosaicing process).

Under control by the CCU 11201, the display 11202 displays an image that is based on an image signal on which image processing is executed by the CCU 11201.

The light source device 11203 is constituted of a light source such as a Light Emitting Diode (LED) so as to supply irradiation light in capturing an operative part and the like to the endoscope 11100.

An input device 11204 is an input interface with respect to the endoscopic surgery system 11000. Via the input device 11204 and to the endoscopic surgery system 11000, a user is able to input various kinds of information and give input instructions. For example, a user is able to input an instruction for changing a capturing condition (type, magnification, and focus distance of irradiation light, etc.) of the endoscope 11100.

A treatment-tool controller 11205 controls operations of the energy processing apparatus 11112 for cautery and incision of a tissue, sealing of a blood vessel, and the like. In order to inflate a body cavity of the patient 11132 for ensuring view of the endoscope 11100 and a working space of an operator, a pneumoperitoneum device 11206 delivers gas into the body cavity via the pneumoperitoneum tube 11111. A recorder 11207 is a device capable of recording various kinds of information on operations. A printer 11208 is a device that is capable of printing the various kinds of information on operations in a form of text, image, graph, etc.

The light source device 11203 that supplies, to the endoscope 11100, irradiation light in capturing an operative part may be constituted of a white light source that includes an LED, a laser light source, or a combination thereof, for example. When the white light source is constituted of a combination of RGB laser light sources, an output intensity and an output timing of each color (each wavelength) are able to be controlled with high accuracy, so that it is possible to adjust a white balance of a captured image by using the light source device 11203. In this case, laser light may be irradiated to an observation target on time-sharing basis from each of the RGB laser light sources, and operations of an image capturing element of the camera head 11102 may be controlled in synchronization with the corresponding irradiation timing to capture images corresponding to respective RGB on time-sharing basis. By employing the above-mentioned method, it is possible to obtain color images without providing a color filter to the image capturing element.

Moreover, operations of the light source device 11203 may be controlled such that an intensity of output light is changed at predetermined time intervals. Operations of an image capturing element of the camera head 11102 is controlled in synchronization with a change timing in a light intensity so as to acquire images on time-sharing basis, and the acquired images are synthesized to be able to generate an image having a high dynamic range without black defects and halation.

The light source device 11203 may be configured to be capable of supplying light within a predetermined wavelength band corresponding to a special light observation. In the special light observation, by using wavelength dependence of light absorbance in a body tissue, for example, a light having a narrower band than that of irradiation light (namely, white light) used in a common observation is irradiated so as to capture a predetermined tissue such as blood vessels in a mucosal surface with a high contrast, namely, a narrow-band light observation (Narrow Band Imaging) is executed. Or in the special light observation, a fluorescence observation may be executed in which images are obtained by using fluorescence that is generated by irradiation of excited light. In the fluorescence observation, for example, excited light is irradiated to a body tissue so as to observe fluorescence from the body tissue (autofluorescence observation), or a reagent such as indocyanine green (ICG) is locally injected into a body tissue and excited light corresponding to a fluorescence wavelength of the reagent is irradiated to the body tissue so as to obtain a fluorescence image. The light source device 11203 may be configured to supply narrow band light and/or excited light corresponding to such a special light observation.

Figure 14:
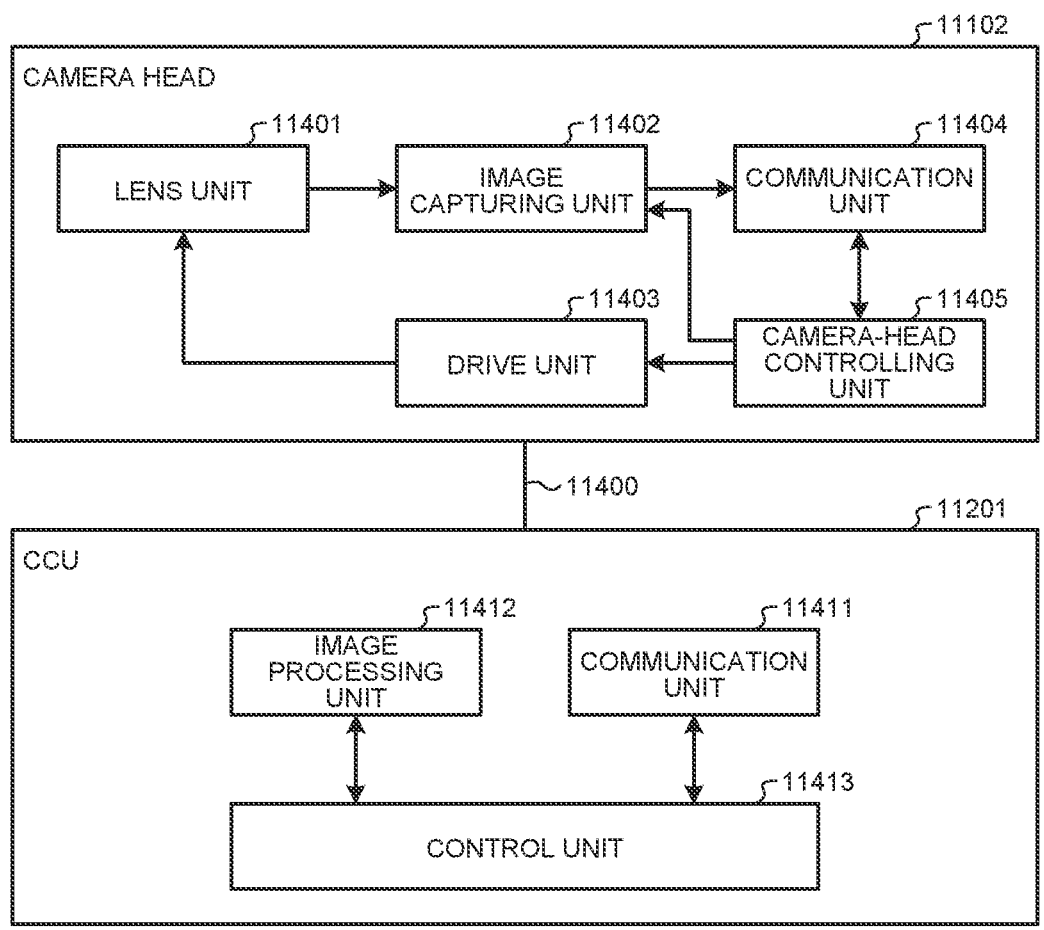
FIG. 14 is a block diagram illustrating one example of functional configurations of a camera head and a Camera Control Unit (CCU).

FIG. 14 is a block diagram illustrating one example of functional configurations of the camera head 11102 and the CCU 11201 illustrated in FIG. 13.

The camera head 11102 includes a lens unit 11401, an image capturing unit 11402, a drive unit 11403, a communication unit 11404, and a camera-head controlling unit 11405. The CCU 11201 includes a communication unit 11411, an image processing unit 11412, and a control unit 11413. The camera head 11102 and the CCU 11201 are connected to be able to communicate with each other by a transmission cable 11400.

The lens unit 11401 is an optical system arranged at a connection portion with the lens barrel 11101. Observation light captured from a leading end of the lens barrel 11101 is led to the camera head 11102 to be made incident on the lens unit 11401. The lens unit 11401 is constituted of a plurality of combined lenses including a zoom lens and a focus lens.

The image capturing unit 11402 is constituted of an image capturing element. The number of the image capturing elements constituting the image capturing unit 11402 may be one (namely, single plate type) or two or more (namely, multiple plate type). When the image capturing unit 11402 has a multiple plate type, for example, image capturing elements may generate image signals respectively corresponding to RGB, and the generated image signals may be synthesized with each other so as to obtain a color image. Or the image capturing unit 11402 may be configured to include a pair of image capturing elements for acquiring respective image signals for the right eye and the left eye, which are corresponding to three-dimensional (3D) display. When 3D display is performed, the operator 11131 is able to more precisely grasp a depth of a biological tissue in an operative part. Note that when the image capturing unit 11402 has a multiple plate type, the plurality of lens units 11401 may be also provided in accordance with the respective image capturing elements.

The image capturing unit 11402 may be not always arranged in the camera head 11102. For example, the image capturing unit 11402 may be arranged just behind an objective lens in the lens barrel 11101.

The drive unit 11403 is constituted of an actuator, and caused by the control of the camera-head controlling unit 11405, moves a zoom lens and a focus lens of the lens unit 11401 along an optical axis by a predetermined distance. Thus, a magnification and a focus of a captured image captured by the image capturing unit 11402 are appropriately adjusted.

The communication unit 11404 is constituted of a communication device for transmitting and receiving various kinds of information to and from the CCU 11201. The communication unit 11404 transmits, in a form of RAW data, an image signal obtained from the image capturing unit 11402 to the CCU 11201 via the transmission cable 11400.

The communication unit 11404 receives, from the CCU 11201, a control signal for controlling operations of the camera head 11102, and supplies the received control signal to the camera-head controlling unit 11405. The control signal includes information on capturing conditions such as information that specifies a frame rate of a captured image, information that specifies an exposure value in capturing, and/or information that specifies a magnification and a focus of a captured image.

The above-mentioned capturing conditions of a frame rate, an exposure value, a magnification, a focus, and the like may be appropriately specified by a user, or may be automatically set by the control unit 11413 of the CCU 11201 on the basis of an acquired image signal. In the latter case, i.e. an Auto Exposure (AE) function and an Auto White Balance (AWB) function may be implemented to the endoscope 11100.

The camera-head controlling unit 11405 controls operations of the camera head 11102 on the basis of a control signal transmitted from the CCU 11201 and received via the communication unit 11404.

The communication unit 11411 is constituted of a communication device that transmits and receives various kinds of information to and from the camera head 11102. The communication unit 11411 receives an image signal transmitted via the transmission cable 11400 from the camera head 11102.

The communication unit 11411 transmits, to the camera head 11102, a control signal for controlling operations of the camera head 11102. The image signal and the control signal are transmitted by using electrical communication or light communication.

The image processing unit 11412 executes various kinds of image processing on an image signal of RAW data transmitted from the camera head 11102.

The control unit 11413 executes various kinds of control on capturing of an operative part and the like by the endoscope 11100 and displaying of a captured image obtained by the capturing of the operative part and the like. For example, the control unit 11413 generates a control signal for controlling operations of the camera head 11102.

On the basis of an image signal on which image processing is executed by the image processing unit 11412, the control unit 11413 causes the display 11202 to display a captured image on which an operative part and the like appears. In this case, the control unit 11413 may recognize various objects in a captured image by using various image recognizing technologies. For example, the control unit 11413 may detect shapes, colors, etc. of an edge of an object included in a captured image so as to recognize a surgical instrument such as a forceps, a specific biological part, hemorrhage, mist in using the energy processing apparatus 11112. When causing the display 11202 to display the captured image, the control unit 11413 may display an image of the operative part while superposing thereon various kinds of operation assisting information by using the recognition result. When the operation assisting information is displayed in a superposed manner to be presented to the operator 11131, a burden of the operator 11131 is able to be reduced, and further the operator 11131 is able to reliably carry out his/her operation.

The transmission cable 11400 connecting the camera head 11102 and the CCU 11201 to each other may be an electric signal cable corresponding to communication of electrical signals, an optical fiber corresponding to optical communication, or a combination cable thereof.

In the illustrated example, communication is carried out in a wired manner by using the transmission cable 11400; however, communication between the camera head 11102 and the CCU 11201 may be wirelessly carried out.

Hereinafter, one example of an endoscopic surgery system has been explained, to which the technology according to the present disclosure is applied. The technology according to the present disclosure may be applied to, for example, the endoscope 11100, the image capturing unit 11402 of the camera head 11102, the image processing unit 11412 of the CCU 11201, and the like among the above-mentioned configurations. Specifically, the solid-state image capturing device 100 according to the present disclosure may be applied to the endoscope 11100, the image capturing unit 11402 of the camera head 11102, the image processing unit 11412 of the CCU 11201, and the like. When the technology according to the present disclosure is applied thereto, performance of the endoscopic surgery system is able to be improved. For example, when the solid-state image capturing device 100 is employed whose dynamic range is enlarged, it is possible to obtain high-definition captured images. Specifically, an object is easily recognized in capturing the inside and the outside of a living body even in a case of a position whose difference in brightness is large. Moreover, fast operation of the solid-state image capturing device is realized, so that it is possible to shorten a time interval needed for operation from a time when an object is detected to a time when the camera head 11102 and the like are controlled.

5. Application Example to Moving Body

The technology (present technology) according to the present disclosure may be applied to various products. For example, the technology according to the present disclosure may be realized as a device that is provided in a moving body such as an automobile, an electric automobile, a hybrid electric automobile, a motorcycle, a bicycle, a personal mobility, an airplane, a drone, a vessel, and a robot.

Figure 15:
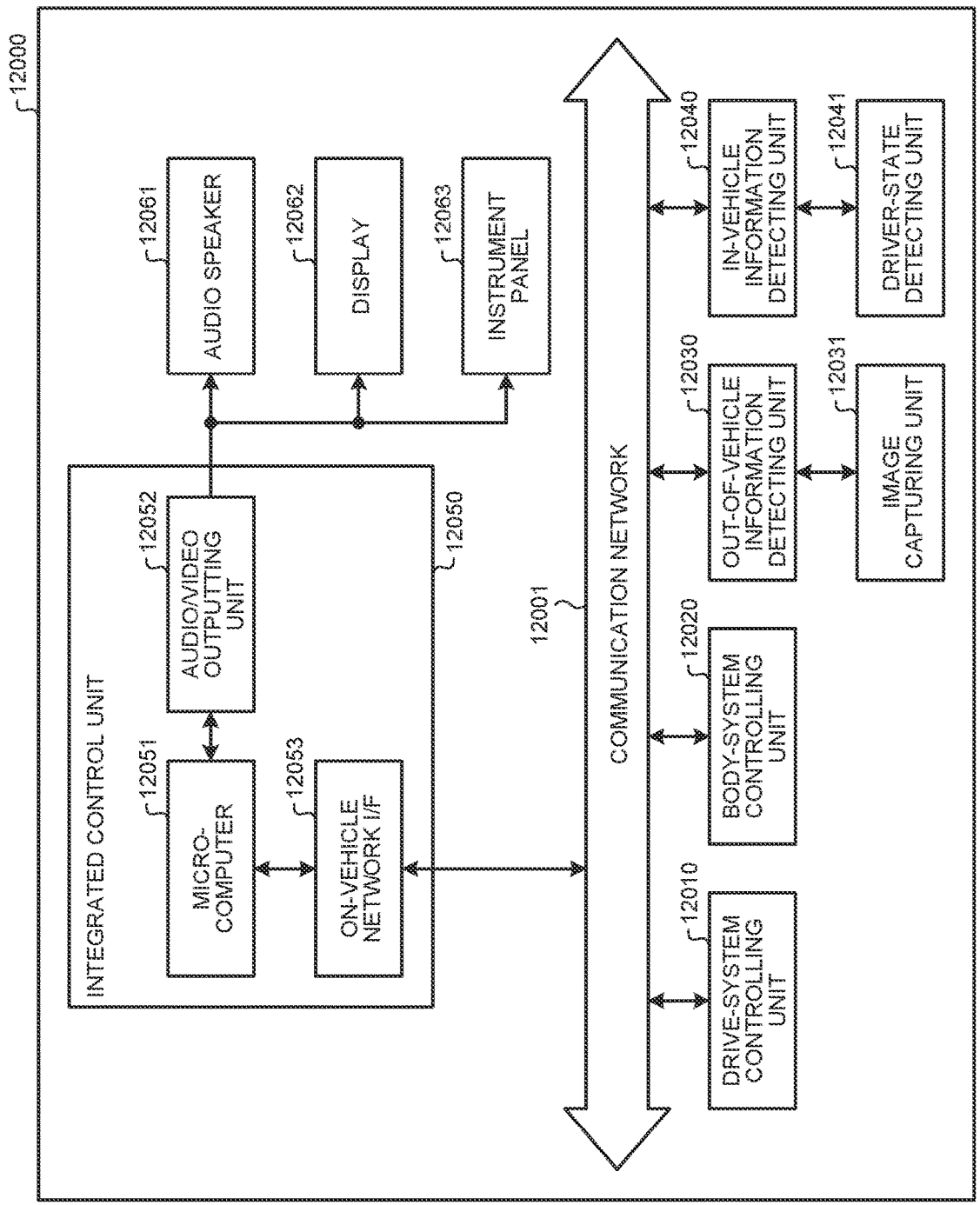
FIG. 15 is a block diagram illustrating one example of a schematic configuration of a vehicle controlling system.

FIG. 15 is a block diagram illustrating one example of a schematic configuration of a vehicle controlling system that is one example of a moving-body control system to which the technology according to the present disclosure is to be applied.

A vehicle controlling system 12000 includes a plurality of electrical control units that is connected to each other via a communication network 12001. In the example illustrated in FIG. 15, the vehicle controlling system 12000 includes a drive-system controlling unit 12010, a body-system controlling unit 12020, an out-of-vehicle information detecting unit 12030, an in-vehicle information detecting unit 12040, and an integrated control unit 12050. As a functional configuration of the integrated control unit 12050, there are illustrated a microcomputer 12051, an audio/video outputting unit 12052, and an on-vehicle network I/F (interface) 12053.

The drive-system controlling unit 12010 controls operations of devices related to a drive system of a vehicle in accordance with various programs. For example, the drive-system controlling unit 12010 functions as a controller of a driving-force generating device that generates driving force of a vehicle such as an internal combustion engine and a drive motor, a driving-force transmitting mechanism that transmits driving force to wheels, a steering mechanism that adjusts a steering angle of a vehicle, a braking device that generates braking force of a vehicle, and the like.

The body-system controlling unit 12020 controls operations of various devices provided in a vehicle body in accordance with various programs. For example, the body-system controlling unit 12020 functions as a controller of a keyless entry system, a smart key system, a power window device, or various lamps such as a headlight, a back lamp, a brake lamp, a blinker, or a fog lamp. In this case, an electrical wave sent from a portable device substituted for a key or signals of various switches may be input to the body-system controlling unit 12020. The body-system controlling unit 12020 receives input of these electrical waves or signals so as to control a door locking device, a power window device, a lamp, etc. of a vehicle.

The out-of-vehicle information detecting unit 12030 detect information on the outside of a vehicle in which the vehicle controlling system 12000 is provided. For example, the out-of-vehicle information detecting unit 12030 is connected to an image capturing unit 12031. The out-of-vehicle information detecting unit 12030 causes the image capturing unit 12031 to capture images of the outside of a vehicle, and further receives the captured images. On the basis of the received images, the out-of-vehicle information detecting unit 12030 may execute a detection process for detecting an object such as a human being, an automobile, an obstacle, a sign, and letters on a road surface; or a distance detecting process.

The image capturing unit 12031 is a light sensor that receives light, and outputs an electrical signal according to a light amount of the received light. The image capturing unit 12031 may output the electrical signal as an image, or as information on a measured distance. The light received by the image capturing unit 12031 may be visible light or invisible light such as infrared ray.

The in-vehicle information detecting unit 12040 detects information on the inside of a vehicle. The in-vehicle information detecting unit 12040 is connected to a driver-state detecting unit 12041 that detects a state of a driver, for example. The driver-state detecting unit 12041 may include a camera that captures a driver, for example, and on the basis of detection information input from the driver-state detecting unit 12041, the in-vehicle information detecting unit 12040 may calculate fatigue degree or concentration degree of the driver, or may determine whether or not the driver takes a nap.

On the basis of information on the outside and/or the inside of a vehicle that is acquired by the out-of-vehicle information detecting unit 12030 or the in-vehicle information detecting unit 12040, the microcomputer 12051 may calculate a control target value of a driving-force generating device, a steering mechanism, or a braking device so as to output a control command to the drive-system controlling unit 12010. For example, the microcomputer 12051 is capable of executing cooperative control for realizing function of an Advanced Driver Assistance System (ADAS) including collision avoidance or shock absorbing of a vehicle, follow-up driving based on an inter-vehicle distance, constant-speed driving, collision warning of a vehicle, or lane departure warning of a vehicle.

The microcomputer 12051 controls a driving-force generating device, a steering mechanism, a braking device, or the like on the basis of information on the periphery of a vehicle which is acquired by the out-of-vehicle information detecting unit 12030 or the in-vehicle information detecting unit 12040, so as to execute cooperative control for autonomous driving that autonomously drives independent from operations of a driver.

On the basis of information on the outside of a vehicle which is acquired by the out-of-vehicle information detecting unit 12030, the microcomputer 12051 outputs a control command to the body-system controlling unit 12020. For example, in accordance with a position of a preceding vehicle or an oncoming car which is detected by the out-of-vehicle information detecting unit 12030, the microcomputer 12051 controls a headlight so as to execute cooperative control for antiglare such as changing high beam into low beam.

The audio/video outputting unit 12052 transmits, to an output device capable of visually or aurally providing information to an occupant of a vehicle or the outside of a vehicle, an output signal in a form of one of sounds and images. In the example illustrated in FIG. 15, an audio speaker 12061, a display 12062, and an instrument panel 12063 are exemplified as the output devices. The display 12062 may include at least one of an onboard display and a head up display, for example.

Figure 16:
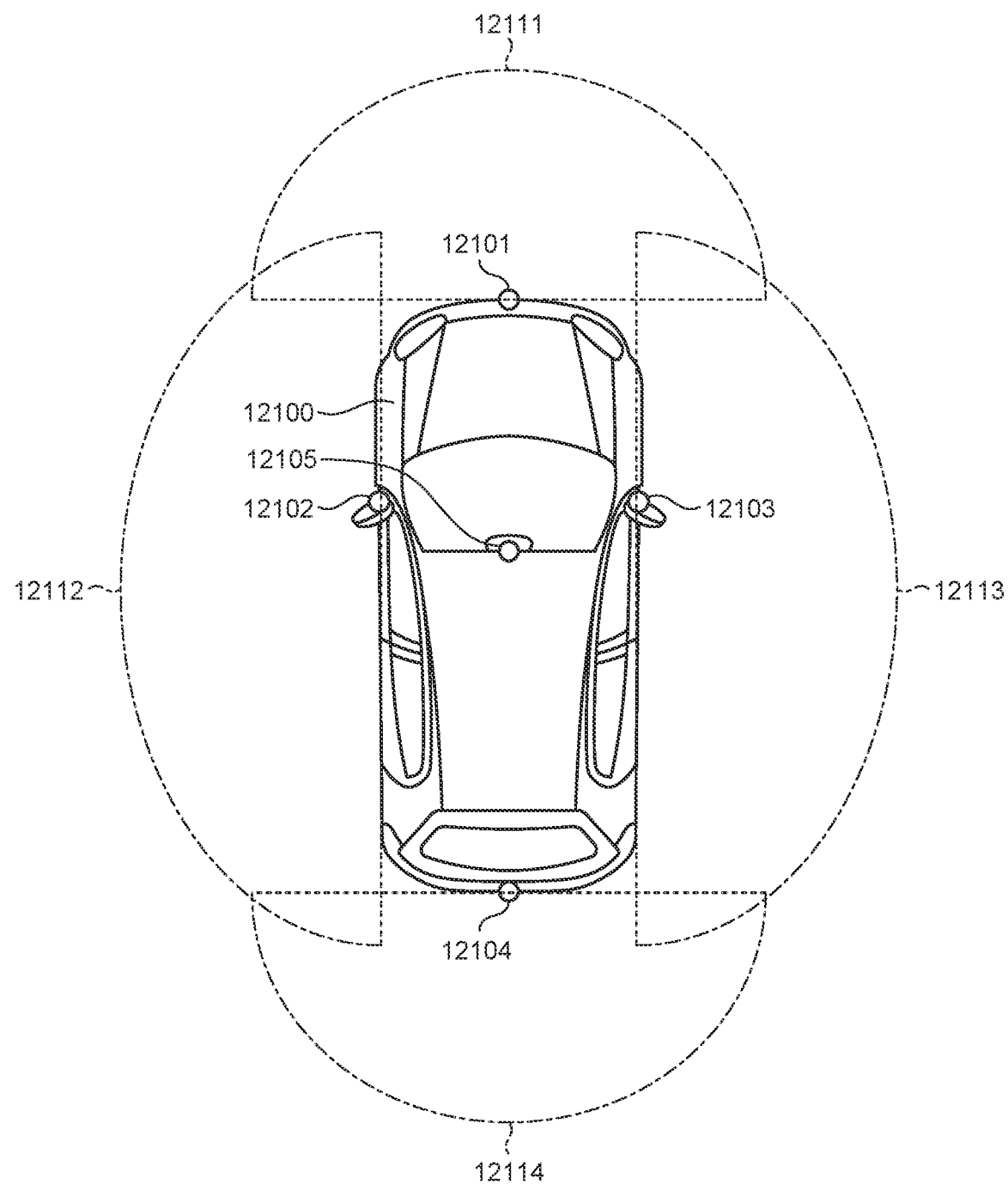
FIG. 16 is a diagram illustrating one example of arrangement positions of an out-of-vehicle information detecting unit and an image capturing unit.

FIG. 16 is a diagram illustrating one example of arrangement positions of the image capturing units 12031.

In FIG. 16, a vehicle 12100 includes image capturing units 12101, 12102, 12103, 12104, and 12105 as the image capturing units 12031.

For example, the image capturing units 12101, 12102, 12103, 12104, and 12105 are arranged at positions in the vehicle 12100, for example, a front nose, a side mirror, a rear bumper, a back door, an upper part of a windscreen in the interior of a vehicle, etc. The image capturing unit 12101 arranged at a front nose and the image capturing unit 12105 arranged at an upper part of a windscreen in the interior of a vehicle mainly acquire images in front of the vehicle 12100. The image capturing units 12102 and 12103 arranged at side mirrors mainly acquire side images of the vehicle 12100. The image capturing unit 12104 arranged at a rear bumper or a back door acquires an image in the rear of the vehicle 12100. Front images acquired by the image capturing units 12101 and 12105 are mainly used for detecting a preceding vehicle, a pedestrian, an obstacle, a traffic light, a road sign, a lane, or the like.

In FIG. 16, there is illustrated one example of capturing ranges of the image capturing units 12101 to 12104. A capturing range 12111 indicates a capturing range of the image capturing unit 12101 arranged at a front nose, capturing ranges 12112 and 12113 indicate capturing ranges of the image capturing units 12102 and 12103 arranged at respective side mirrors, and a capturing range 12114 indicates a capturing range of the image capturing unit 12104 arranged at a rear bumper or a back door. For example, image data obtained by the image capturing units 12101 to 12104 are overlapped with each other to obtain a bird's-eye image viewed from above the vehicle 12100.

At least one of the image capturing units 12101 to 12104 may have function for acquiring distance information. For example, at least one of the image capturing units 12101 to 12104 may be a stereo camera constituted of a plurality of image capturing elements, or may be an image capturing element including pixels for detecting phase difference.

For example, on the basis of distance information obtained from the image capturing units 12101 to 12104, the microcomputer 12051 obtains distances up to a three-dimensional object in the capturing ranges 12111 to 12114 and temporal changes (relative velocity with respect to vehicle 12100) in the distances to be able to extract, as a preceding vehicle, a three-dimensional object that is present on a travelling road of the vehicle 12100 and closest to the vehicle 12100, and is traveling at a predetermined velocity (for example, equal to or more than 0 km/h) in a direction similar to that of the vehicle 12100. Moreover, the microcomputer 12051 may set an inter-vehicle distance to be kept up to a preceding vehicle so as to execute automatic braking control (including follow-up stopping control), automatic acceleration control (including follow-up starting control), and the like. As described above, cooperative control is able to be executed for autonomous driving aimed at autonomous traveling independent from operation of a driver and the like.

For example, on the basis of distance information obtained from the image capturing units 12101 to 12104, the microcomputer 12051 classifies and extracts three-dimensional object data on three-dimensional objects into a motorcycle, a standard-sized vehicle, a large-sized vehicle, a pedestrian, another three-dimensional object such as a utility pole to be able to use it for automatic avoidance of an obstacle. For example, the microcomputer 12051 determines an obstacle in the periphery of the vehicle 12100 into an obstacle that is able to be visually recognized by a driver of the vehicle 12100 or an obstacle whose visual recognition is difficult. The microcomputer 12051 determines a collision risk indicating a risk of collision with each obstacle, and in a case of a situation where a collision risk is equal to or more than a set value and there presents possibility of collision, causes the audio speaker 12061 or the display 12062 to output a warning to a driver, or causes the drive-system controlling unit 12010 to execute forced deceleration or avoidance steering, so as to assist in driving for collision avoidance.

At least one of the image capturing units 12101 to 12104 may be an infrared camera that detects infrared ray. For example, the microcomputer 12051 determines whether or not there presents a pedestrian in captured images of the image capturing units 12101 to 12104 to be able to recognize a pedestrian. The above-mentioned recognition of a pedestrian is constituted of a procedure for extracting feature points from captured images of the image capturing units 12101 to 12104 as infrared cameras, and a procedure for executing a pattern matching process on a series of feature points indicating an outline of an object so as to determine whether or not there presents a pedestrian, for example. When the microcomputer 12051 determines that there presents a pedestrian in captured images of the image capturing units 12101 to 12104 to recognize the pedestrian, the audio/video outputting unit 12052 controls the display 12062 such that a rectangular outline for emphasis is displayed in a superposed manner on the recognized pedestrian. The audio/video outputting unit 12052 may control the display 12062 such that an icon and the like indicating a pedestrian is displayed at a desired position.

As described above, one example of the vehicle controlling system has been explained to which the technology according to the present disclosure is applied. The technology according to the present disclosure may be applied to the image capturing unit 12031 of the above-mentioned configurations. Specifically, the solid-state image capturing device 100 according to the present disclosure may be applied to the image capturing unit 12031. When the technology according to the present disclosure is applied to the image capturing unit 12031, performance of a vehicle controlling system is able to be improved. For example, high-definition captured images are able to be obtained by using the solid-state image capturing device 100 whose dynamic range is enlarged. Specifically, even at a position whose difference in brightness is large in capturing the outside and the inside of a vehicle, recognition of an object becomes easy. Moreover, fast operation of the solid-state image capturing device is realized, so that it is possible to shorten a time interval needed for operation from a time when an object is detected to a time of a vehicle control.

The effects described in the present specification are merely explanations or exemplifications, and are not limiting. In other words, the techniques according to the present disclosure may exert other effects.

Configurations below also belong to the technical scope of the present disclosure.

(1)
A solid-state image capturing system including:
a solid-state image capturing device; and
an information processing device, wherein
the solid-state image capturing device includes:
a first Deep-Neural-Network (DNN) processing unit that executes, on image data, a part of a DNN algorithm by a first DNN to generate a first result, and
the information processing device includes:
a second DNN processing unit that executes, on the first result acquired from the solid-state image capturing device, remaining of the DNN algorithm by a second DNN to generate a second result.

(2)
The solid-state image capturing system according to (1), wherein
the first result includes a feature map that is output from an intermediate layer of the DNN algorithm.

(3)
The solid-state image capturing system according to (1) or (2), wherein
the solid-state image capturing device further includes:
a first storage that stores therein at least the part of the DNN algorithm for executing the first DNN, and
the information processing device further includes:
a second storage that stores therein at least the remaining of the DNN algorithm for executing the second DNN.

(4)
The solid-state image capturing system according to (3), wherein
the DNN algorithm to be executed on the image data is stored in the first storage and the second storage.

(5)
The solid-state image capturing system according to any one of (1) to (4), wherein
the solid-state image capturing device further includes:
a first control unit that controls the first DNN processing unit, and
the information processing device further includes:
a second control unit that controls the second DNN processing unit.

(6)
The solid-state image capturing system according to (5), wherein
the first control unit generates first control information including information on the first DNN, and transmits the generated first control information to the second control unit, and
the second control unit generates second control information including information on the second DNN, and transmits the generated second control information to the first control unit.

(7)
The solid-state image capturing system according to (5) or (6), wherein
the first control unit controls the first DNN processing unit based on the second control information, and
the second control unit controls the second DNN processing unit based on the first control information.

(8)
8. The solid-state image capturing system according to any one of (5) to (7), wherein
the first control unit transmits, to the second control unit, an execution completion notification of the first DNN processing unit, and
the second control unit transmits, to the first control unit, an execution completion notification of the second DNN processing unit.

(9)
The solid-state image capturing system according to any one of (1) to (8), wherein
the information processing device includes one of an application processor and a cloud server.

(10)
A solid-state image capturing device including:
a DNN processing unit configured to:
execute, on image data, a part of a DNN algorithm; and
generate a first result to be transmitted to an information processing device that executes remaining of the DNN algorithm.

(11)
The solid-state image capturing device according to (10), wherein
the first result includes a feature map that is output from an intermediate layer of the DNN algorithm.

(12)
The solid-state image capturing device according to (10) or (11), further including:
a storage that stores therein at least a part of the DNN algorithm.

(13)
An information processing device including:
a DNN processing unit configured to:
receive, from a solid-state image capturing device, a first result of execution of a part of a DNN algorithm on image data; and
execute, on the first result, remaining of the DNN algorithm to generate a second result.

(14)
The information processing device according to (13), further including:
a storage that stores therein at least the remaining of the DNN algorithm to be executed on the first result.

(15)
An image processing method allowing a processor to execute the following steps:
executing, on image data, a part of a DNN algorithm; and
generating a first result to be transmitted to an information processing device that executes remaining of the DNN algorithm.

(16)
An information processing method allowing a processor to execute the following steps:
receiving, from a solid-state image capturing device, a first result of execution of a part of a DNN algorithm on image data; and
executing, on the first result, remaining of the DNN algorithm to generate a second result.

(17)

A program allowing a computer to function as:
a DNN processing unit configured to:
execute, on image data, a part of a DNN algorithm; and generate a first result to be transmitted to an information processing device that executes remaining of the DNN algorithm.

(18)

A program allowing a computer to function as:
a DNN processing unit configured to:
receive, from a solid-state image capturing device, a first result of execution of a part of a DNN algorithm on image data; and
execute, on the first result, remaining of the DNN algorithm to generate a second result.

REFERENCE SIGNS LIST

1 Solid-state image capturing system
10 Housing
11 First substrate
12 Second substrate
100 Solid-state image capturing device
110 Image capturing unit
120 Capture processing unit
130 First DNN processing unit
140 First storage
150 First control unit
160 Selector
170, 210 Communication I/F
171, 212 Transmitting unit
172, 211 Reception unit
180, 220 Communication controlling unit
200 Information processing device
230 Second DNN processing unit
240 Second storage
250 Second control unit

The invention claimed is:

1. A solid-state image capturing system, comprising:
a solid-state image capturing device; and
an information processing device, wherein
the solid-state image capturing device includes:
a first Deep-Neural-Network (DNN) processing unit that is configured to execute, on image data, a part of a DNN algorithm by a first DNN to generate a first result, and
the information processing device includes:
a second DNN processing unit that is configured to execute, on the first result acquired from the solid-state image capturing device, a remaining part of the DNN algorithm by a second DNN to generate a second result,
wherein the information processing device is configured to:
generate second control information which indicates completion of the execution of the second DNN, and
transmit the generated second control information to the solid-state image capturing device.

2. The solid-state image capturing system according to claim 1, wherein
the first result includes a feature map that is output from an intermediate layer of the DNN algorithm.

3. The solid-state image capturing system according to claim 1, wherein
the solid-state image capturing device further includes:
a first storage that is configured to store therein at least the part of the DNN algorithm for execution of the first DNN, and
the information processing device further includes:
a second storage that is configured to store therein at least the remaining part of the DNN algorithm for the execution of the second DNN.

4. The solid-state image capturing system according to claim 3, wherein
the DNN algorithm to be executed on the image data is stored in the first storage and the second storage.

5. The solid-state image capturing system according to claim 1, wherein
the solid-state image capturing device further includes:
a first control unit that is configured to control the first DNN processing unit, and
the information processing device further includes:
a second control unit that is configured to control the second DNN processing unit.

6. The solid-state image capturing system according to claim 5, wherein
the first control unit configured to generate first control information including information on the first DNN, and transmit the generated first control information to the second control unit, and
the second control unit configured to generate the second control information including information on the second DNN, and transmit the generated second control information to the first control unit.

7. The solid-state image capturing system according to claim 6, wherein
the first control unit configured to control the first DNN processing unit based on the second control information, and
the second control unit configured to control the second DNN processing unit based on the first control information.

8. The solid-state image capturing system according to claim 5, wherein
the first control unit configured to transmit, to the second control unit, an execution completion notification of the first DNN processing unit, and
the second control unit configured to transmit, to the first control unit, an execution completion notification of the second DNN processing unit.

9. The solid-state image capturing system according to claim 1, wherein
the information processing device includes one of an application processor and a cloud server.

10. A solid-state image capturing device, comprising:
a Deep-Neural-Network (DNN) processing unit configured to:
execute, on image data, a part of a DNN algorithm by a first DNN;
generate a first result to be transmitted to an information processing device,
wherein the information processing device executes a remaining part of the DNN algorithm by a second DNN and generates second control information which indicates completion of the execution of the second DNN; and
receive the generated second control information from the information processing device.

11. The solid-state image capturing device according to claim 10, wherein
the first result includes a feature map that is output from an intermediate layer of the DNN algorithm.

12. The solid-state image capturing device according to claim 10, further comprising:
a storage that is configured to store therein at least the part of the DNN algorithm.

13. An information processing device, comprising:
a Deep-Neural-Network (DNN) processing unit configured to:
receive, from a solid-state image capturing device, a first result of execution of a part of a DNN algorithm by a first DNN on image data;
execute, on the first result, a remaining part of the DNN algorithm by a second DNN to generate a second result;
generate second control information which indicates completion of the execution of the second DNN; and
transmit the generated second control information to the solid-state image capturing device.

14. The information processing device according to claim 13, further comprising:
a storage that is configured to store therein at least the remaining part of the DNN algorithm to be executed on the first result.

15. An image processing method, comprising:
in a solid-state image capturing device:
executing, on image data, a part of a Deep-Neural-Network (DNN) algorithm by a first DNN;
generating a first result to be transmitted to an information processing device,
wherein the information processing device executes a remaining part of the DNN algorithm by a second DNN and generates second control information which indicates completion of the execution of the second DNN; and
receiving the generated second control information from the information processing device.

16. An information processing method, comprising:
in an information processing device:
receiving, from a solid-state image capturing device, a first result of execution of a part of a Deep-Neural-Network (DNN) algorithm by a first DNN on image data;
executing, on the first result, a remaining part of the DNN algorithm by a second DNN to generate a second result;
generating second control information which indicates completion of the execution of the second DNN; and
transmitting the generated second control information to the solid-state image capturing device.

17. A non-transitory computer-readable medium having stored thereon, computer-executable instructions that when executed by a Deep-Neural-Network (DNN) processing unit, causes the DNN processing unit to execute operations, the operations comprising:
executing, on image data, a part of a DNN algorithm by a first DNN;
generating a first result to be transmitted to an information processing device,
wherein the information processing device executes a remaining part of the DNN algorithm by a second DNN and generates second control information which indicates completion of the execution of the second DNN; and
receiving the generated second control information from the information processing device.

18. A non-transitory computer-readable medium having stored thereon, computer-executable instructions that when executed by a Deep-Neural-Network (DNN) processing unit, causes the DNN processing unit to execute operations, the operations comprising:
receiving, from a solid-state image capturing device, a first result of execution of a part of a DNN algorithm by a first DNN on image data;
executing, on the first result, a remaining part of the DNN algorithm by a second DNN to generate a second result;
generating second control information which indicates completion of the execution of the second DNN; and
transmitting the generated second control information to the solid-state image capturing device.

* * * * *